US008662328B2

(12) United States Patent
Boisvert

(10) Patent No.: US 8,662,328 B2
(45) Date of Patent: Mar. 4, 2014

(54) INTERCONNECTING CONTAINER SYSTEM

(75) Inventor: Raymond Boisvert, Québec (CA)

(73) Assignee: 9224-9838 Quebec Inc., Québec, QC (CA)

( * ) Notice: Subject to any disclaimer, the term of this patent is extended or adjusted under 35 U.S.C. 154(b) by 0 days.

(21) Appl. No.: 13/581,526

(22) PCT Filed: Sep. 22, 2011

(86) PCT No.: PCT/IB2011/054185
§ 371 (c)(1),
(2), (4) Date: Aug. 28, 2012

(87) PCT Pub. No.: WO2012/038928
PCT Pub. Date: Mar. 9, 2012

(65) Prior Publication Data
US 2012/0325766 A1 Dec. 27, 2012

Related U.S. Application Data

(60) Provisional application No. 61/385,777, filed on Sep. 23, 2010.

(51) Int. Cl.
B65D 21/028 (2006.01)
B65D 90/02 (2006.01)
B65D 1/40 (2006.01)
B65D 85/62 (2006.01)
A63H 33/08 (2006.01)

(52) U.S. Cl.
USPC ............ 215/10; 215/383; 215/386; 220/23.4; 220/23.6; 220/669; 220/729; 220/759; 206/504; 446/127

(58) Field of Classification Search
USPC ......... 215/10, 383, 386; 220/23.2, 23.4, 23.6, 220/669, 676, 703, 729, 732, 759, 23.8; 206/504; 446/124, 127
See application file for complete search history.

(56) References Cited

U.S. PATENT DOCUMENTS 180,132 A 7/1876 Hoard
251,566 A 12/1881 Fuller
748,052 A * 12/1903 Doggett ....................... 220/23.4

(Continued)

FOREIGN PATENT DOCUMENTS

EP 0779245 6/1997
EP 1203724 5/2002

(Continued)

Primary Examiner — Anthony Stashick
Assistant Examiner — Jennifer Castriotta
(74) Attorney, Agent, or Firm — Fasken Martineau

(57) ABSTRACT

An interconnecting container system is described. Each container has a rounded rectangular parallelepiped body with four symmetrical sidewalls, a rounded square base and a rounded square top. An elongated sidewall slot is provided on each sidewall, the slot has a surrounding lip thereby creating an internal edge recess. The sidewall slot has an open end and an adjoining closed end. The adjoining closed end is centrally disposed along a transversal axis of the rectangular sidewall. A similarly constructed elongated base slot is provided on the base. The adjoining closed end of the base slot is centrally disposed on the square base. A neck is centrally provided on the top and extends from the top, it has a surrounding rim and an opening thereon. The rim of the neck and the internal recess of the base slot and the sidewall slot are dimensioned and shaped for sliding and interconnecting engagement.

16 Claims, 19 Drawing Sheets

(56) References Cited

U.S. PATENT DOCUMENTS

| | | | |
|---|---|---|---|
| 1,993,978 A | 3/1935 | Plochman | |
| D100,412 S | 7/1936 | Carp | |
| 2,099,174 A | 11/1937 | Payson | |
| 2,780,225 A | 2/1957 | Barr | |
| 3,194,426 A | 7/1965 | Brown | |
| 3,391,824 A | 7/1968 | Wiseman | |
| 3,732,999 A | 5/1973 | Rounkles | |
| 3,994,408 A | 11/1976 | Belitzky | |
| 4,057,946 A | 11/1977 | Barrett | |
| 4,235,343 A | 11/1980 | Thompson | |
| D264,942 S | 6/1982 | Schieser et al. | |
| 4,379,578 A * | 4/1983 | Schuler | 294/31.2 |
| D270,429 S | 9/1983 | Anderson et al. | |
| 4,416,373 A | 11/1983 | deLarosiere | |
| 4,624,383 A | 11/1986 | Moore | |
| D308,824 S | 6/1990 | Wiseman et al. | |
| D312,398 S | 11/1990 | Neto | |
| 5,007,551 A * | 4/1991 | Baroi | 220/23.4 |
| 5,050,757 A | 9/1991 | Hidding | |
| 5,065,875 A | 11/1991 | Balavich | |
| 5,165,558 A | 11/1992 | Cargile | |
| 5,238,129 A | 8/1993 | Ota | |
| 5,316,398 A | 5/1994 | Chandaria et al. | |
| D357,509 S | 4/1995 | Goettner et al. | |
| D362,799 S | 10/1995 | Noble | |
| 5,487,486 A | 1/1996 | Meneo | |
| 5,782,358 A * | 7/1998 | Walker | 206/509 |
| 5,941,411 A | 8/1999 | Langenbach | |
| 5,967,307 A | 10/1999 | Wang | |
| 6,073,757 A | 6/2000 | Kornick et al. | |
| 6,105,814 A | 8/2000 | Chen | |
| 6,276,549 B1 | 8/2001 | Fasci et al. | |
| D447,944 S | 9/2001 | Justice | |
| 6,755,314 B2 | 6/2004 | Cooper | |
| 7,000,794 B2 | 2/2006 | Soehnlen et al. | |
| D527,648 S | 9/2006 | Darr et al. | |
| 7,175,498 B2 * | 2/2007 | Garpow et al. | 446/117 |
| 7,198,080 B2 | 4/2007 | Foust | |
| 7,225,937 B2 | 6/2007 | Schroeder | |
| 7,249,906 B2 | 7/2007 | Kessler et al. | |
| D548,108 S | 8/2007 | Lo | |
| 7,644,828 B1 * | 1/2010 | Klein | 215/10 |
| D613,177 S | 4/2010 | Lee | |
| D635,460 S | 4/2011 | Dorn et al. | |
| 8,393,485 B2 | 3/2013 | Gold et al. | |
| 2004/0197756 A1 | 10/2004 | Yun | |
| 2004/0216340 A1 | 11/2004 | Woods | |
| 2005/0051548 A1 | 3/2005 | Erel | |
| 2006/0030234 A1 | 2/2006 | Stilbert et al. | |
| 2008/0179339 A1 | 7/2008 | Lafaver | |
| 2008/0230504 A1 | 9/2008 | Nowzari | |
| 2008/0308521 A1 | 12/2008 | Caporaso | |
| 2009/0090647 A1 * | 4/2009 | Panchal et al. | 206/504 |
| 2009/0134111 A1 | 5/2009 | Schroeder | |
| 2009/0159603 A1 | 6/2009 | Lilico | |
| 2009/0255893 A1 | 10/2009 | Zummo et al. | |
| 2010/0006534 A1 | 1/2010 | Dlouhy | |
| 2011/0079573 A1 | 4/2011 | Nakamura | |

FOREIGN PATENT DOCUMENTS

| | | |
|---|---|---|
| JP | 2001294259 | 10/2001 |
| JP | 2007055628 | 3/2007 |
| JP | 2009091026 | 4/2009 |
| WO | 9600177 | 1/1996 |
| WO | 9928201 | 6/1999 |
| WO | 0020085 | 4/2000 |
| WO | 0065919 | 11/2000 |
| WO | 2005009849 | 2/2005 |
| WO | 2005028330 | 3/2005 |
| WO | 2005118414 | 12/2005 |
| WO | 2006034231 | 3/2006 |
| WO | 2006046223 | 5/2006 |
| WO | 2006054322 | 5/2006 |
| WO | 2007016535 | 2/2007 |
| WO | 2007067459 | 6/2007 |
| WO | 2008025301 | 3/2008 |
| WO | 2008067656 | 6/2008 |
| WO | 2009103140 | 8/2009 |

* cited by examiner

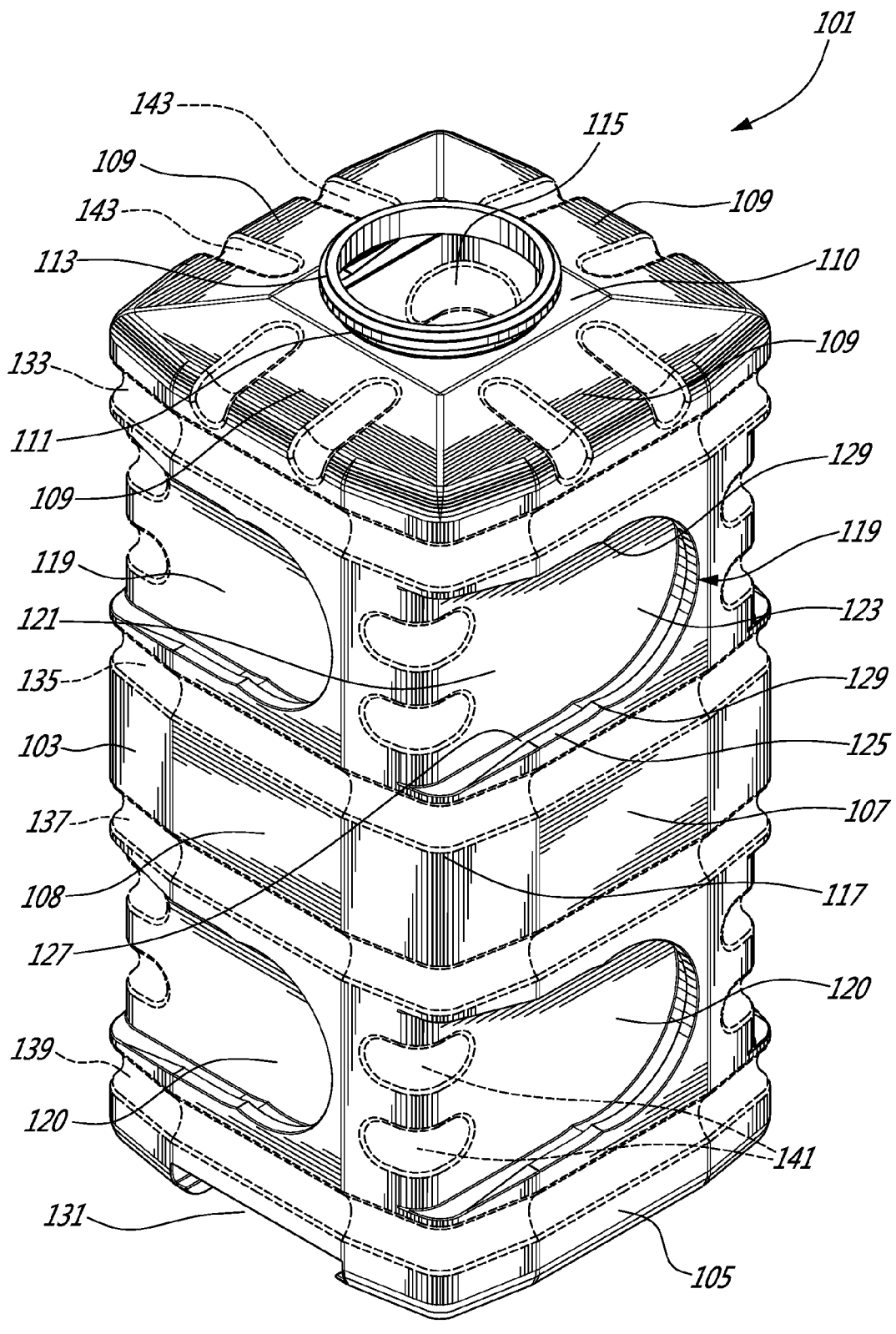

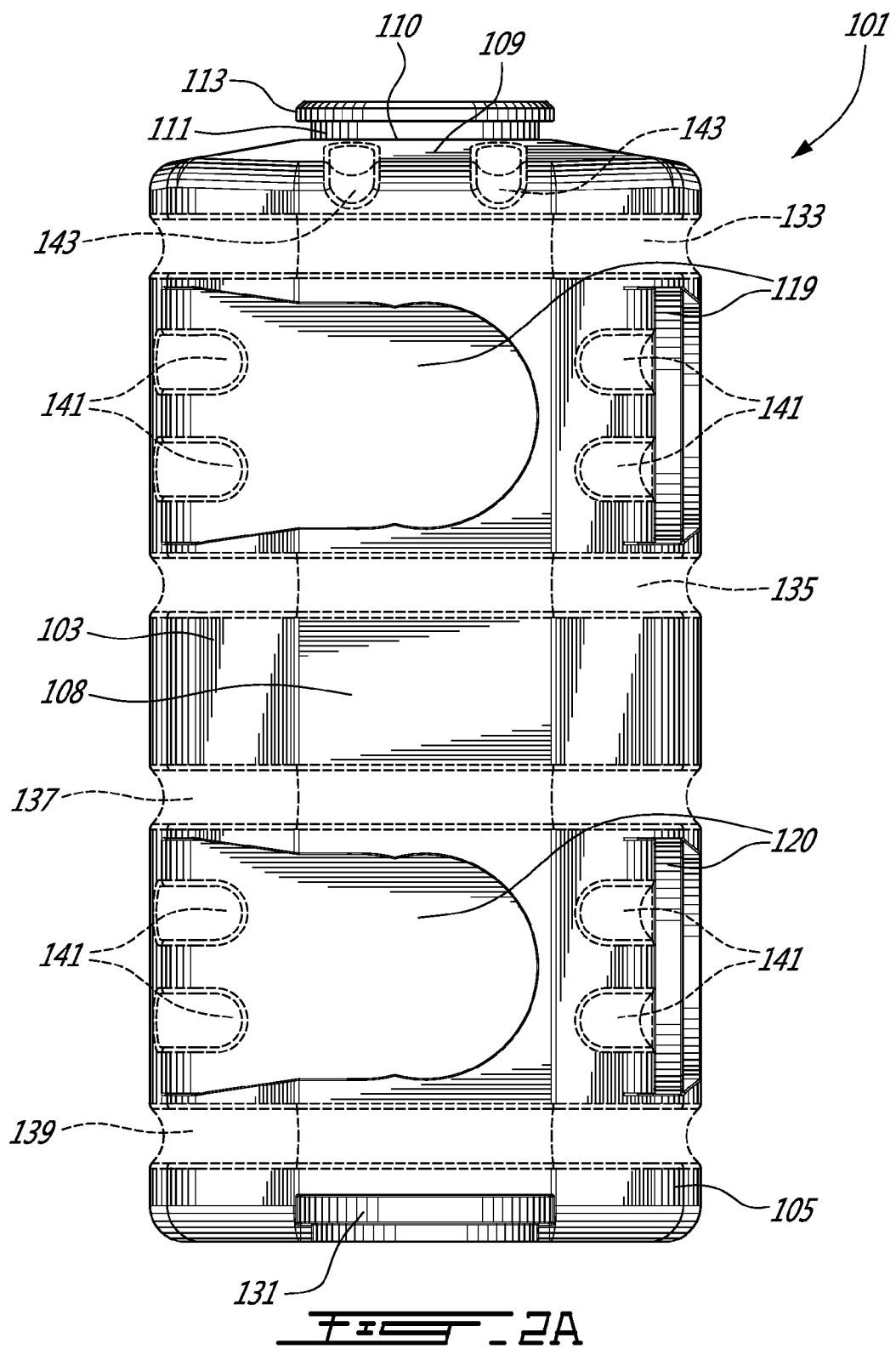

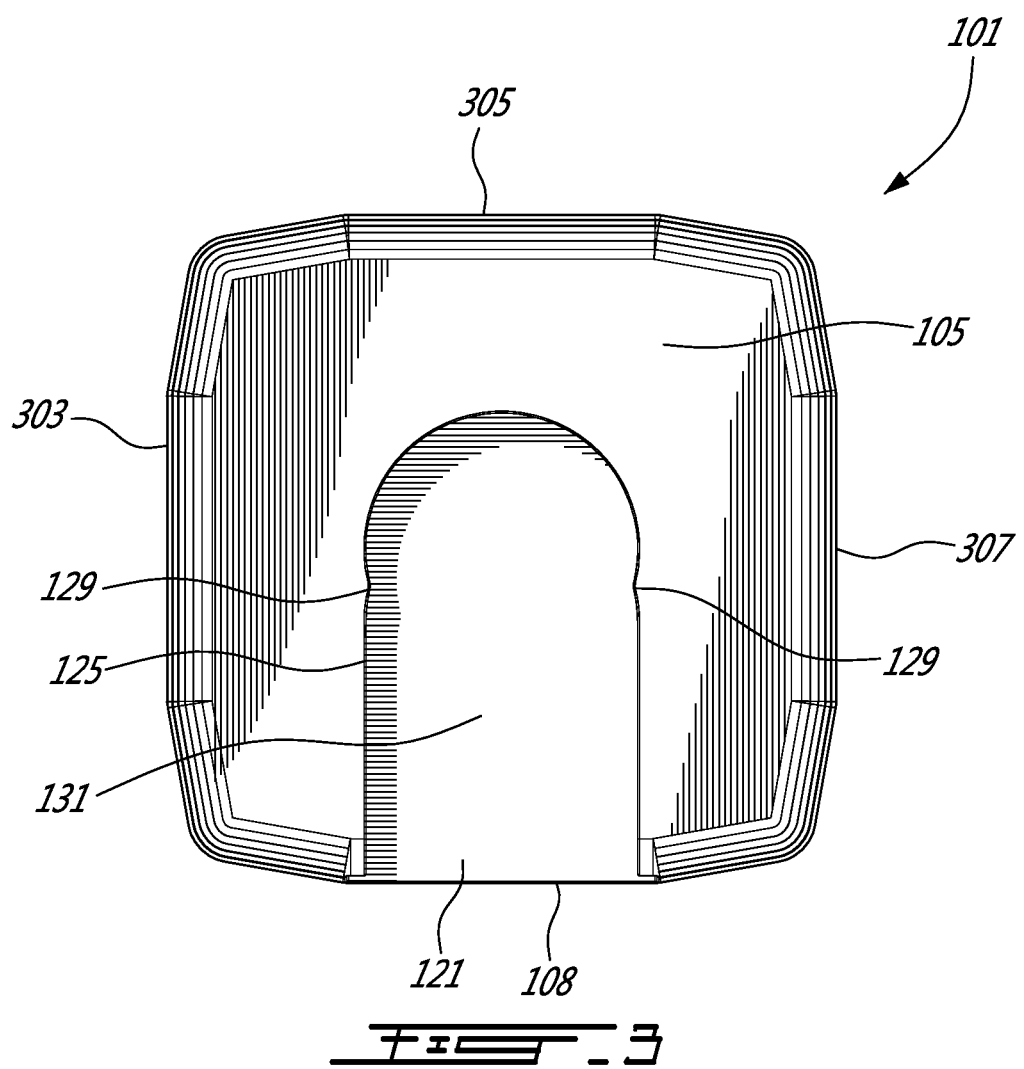

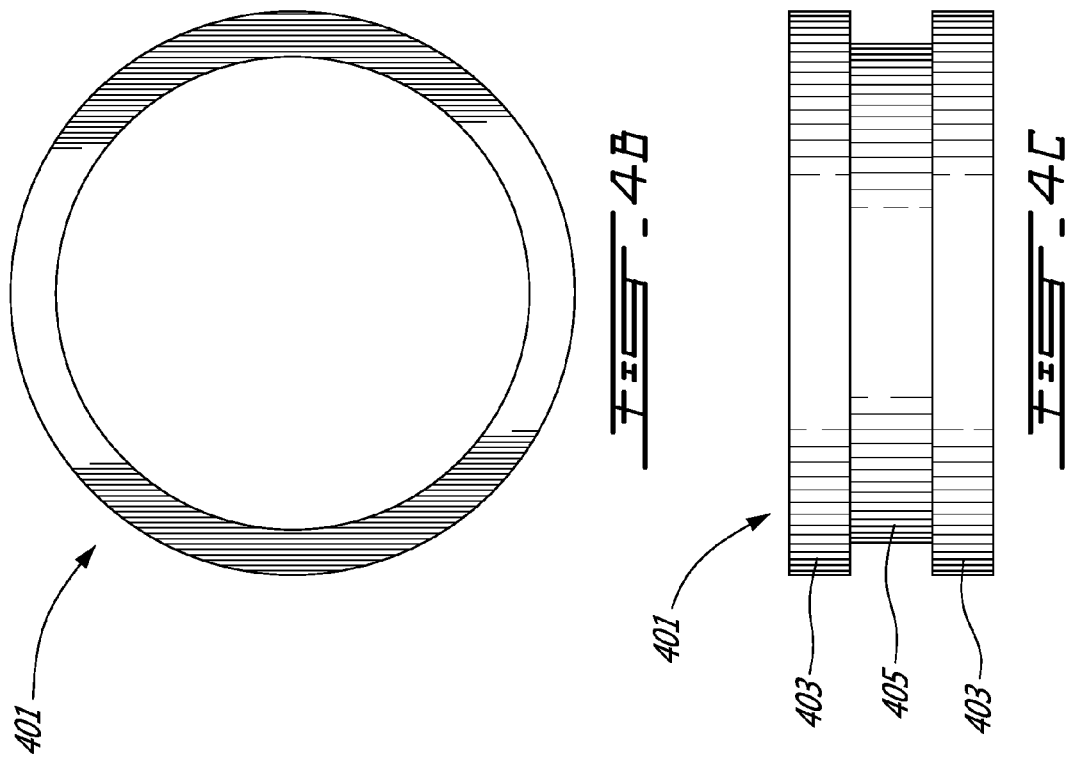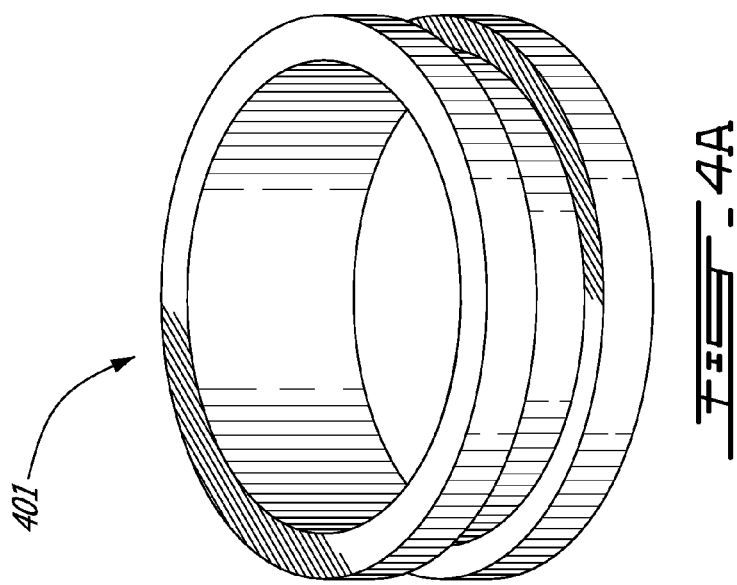

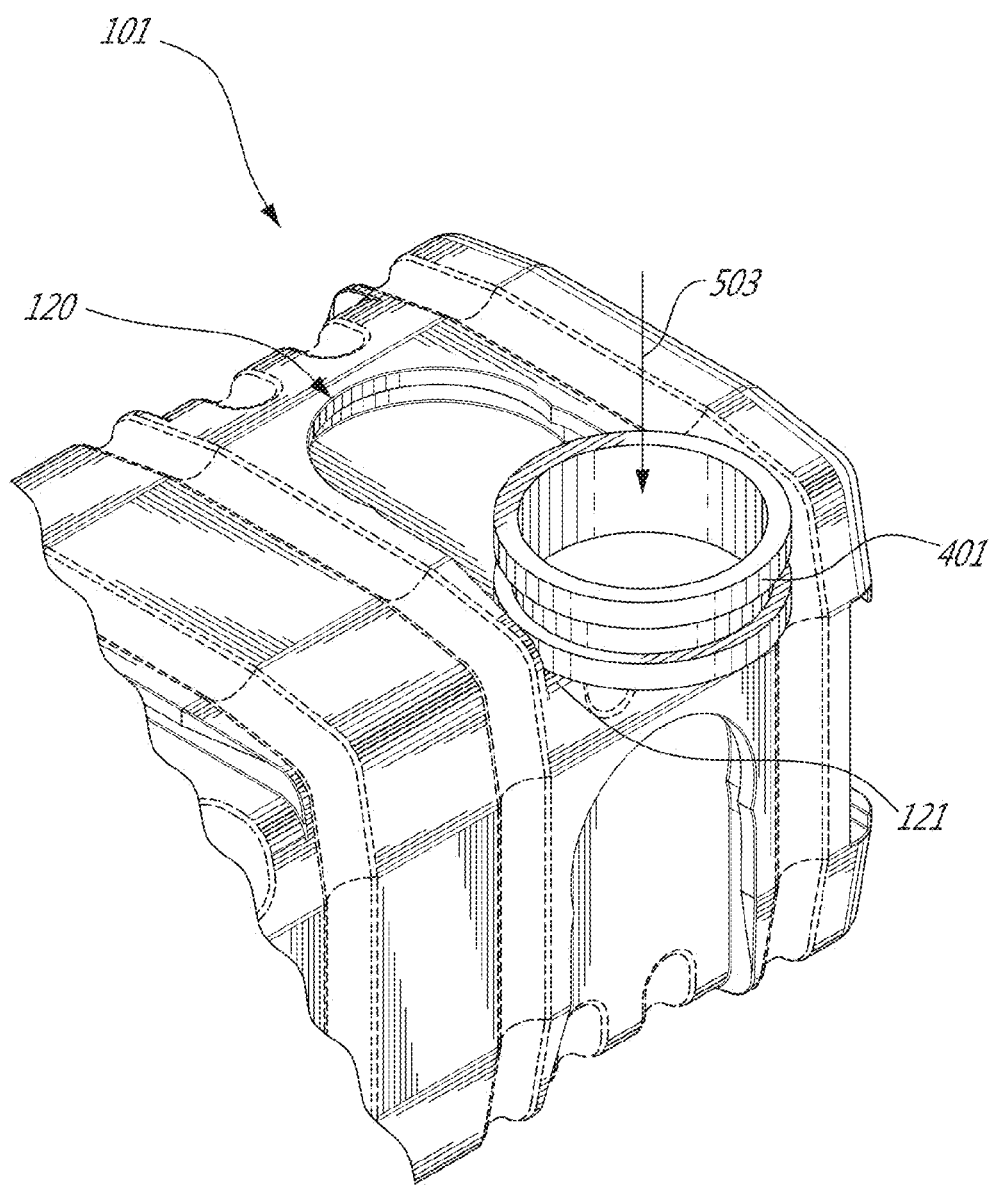

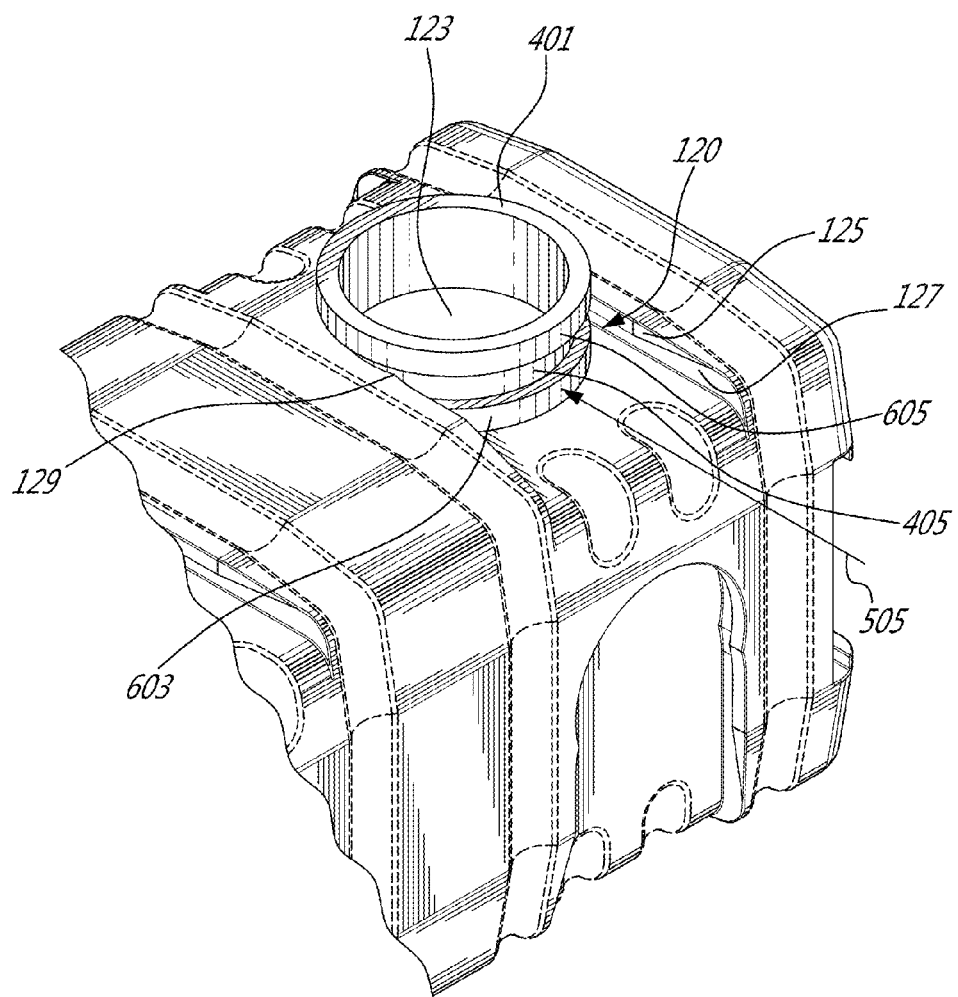

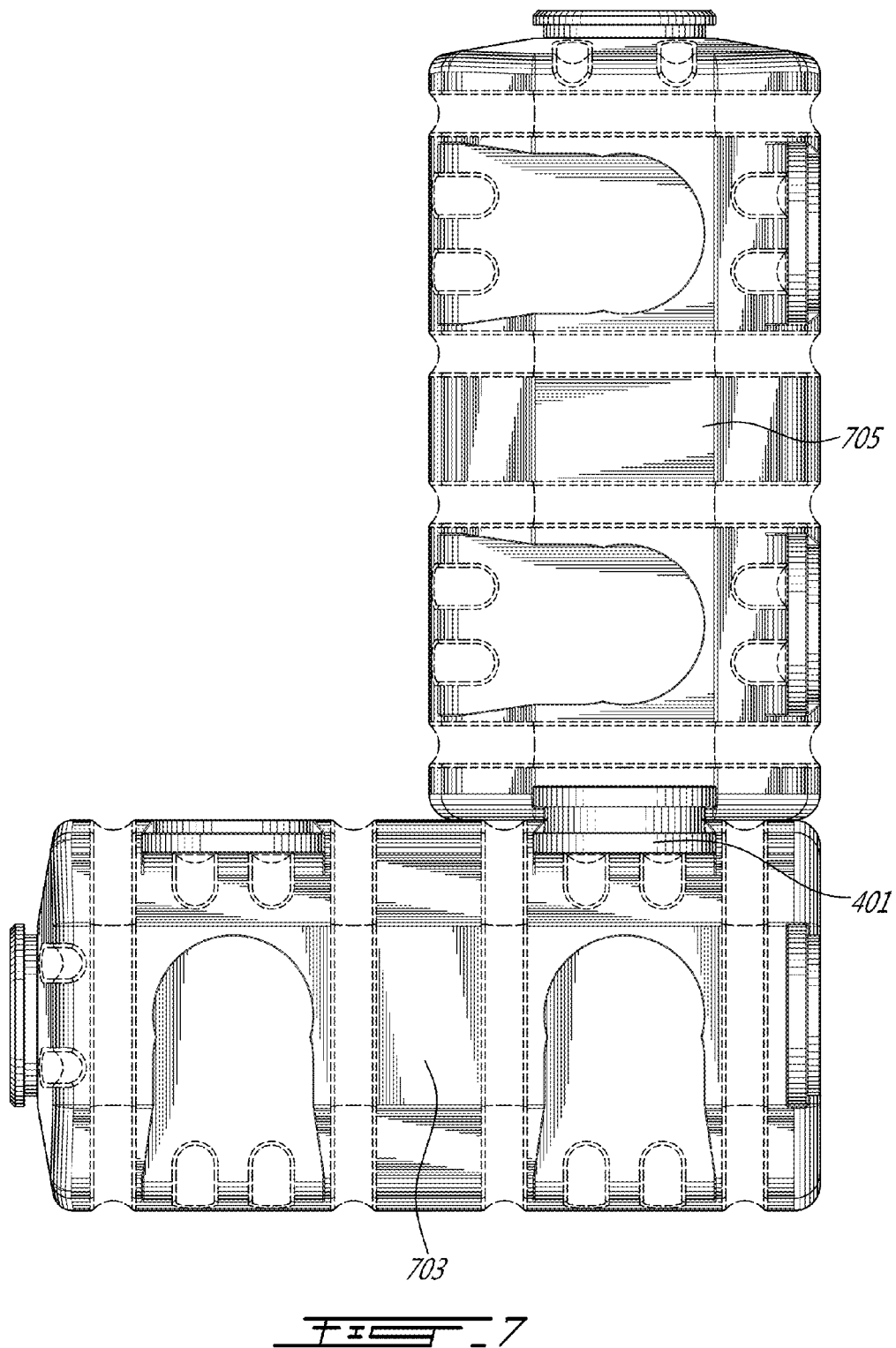

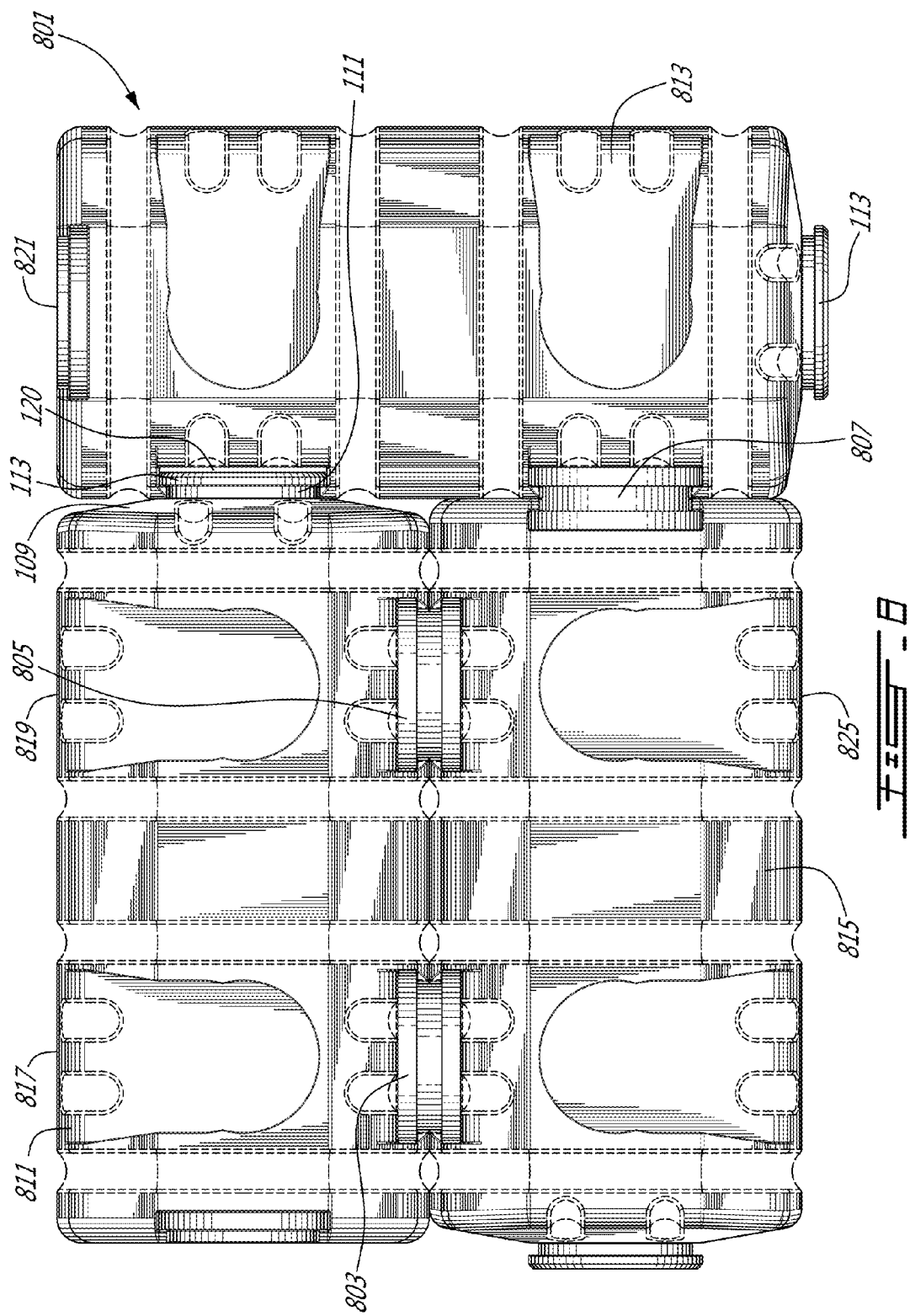

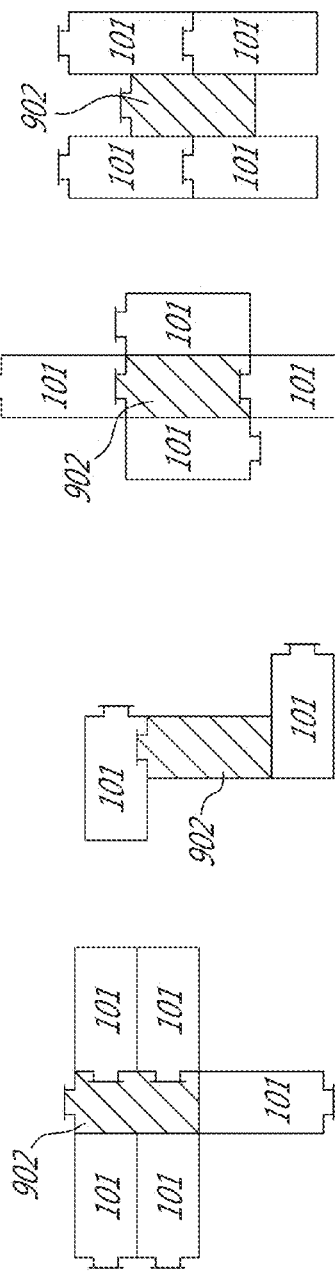
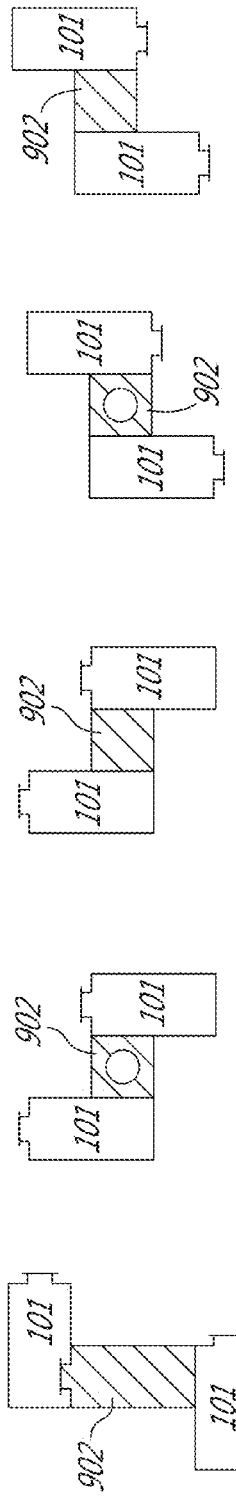

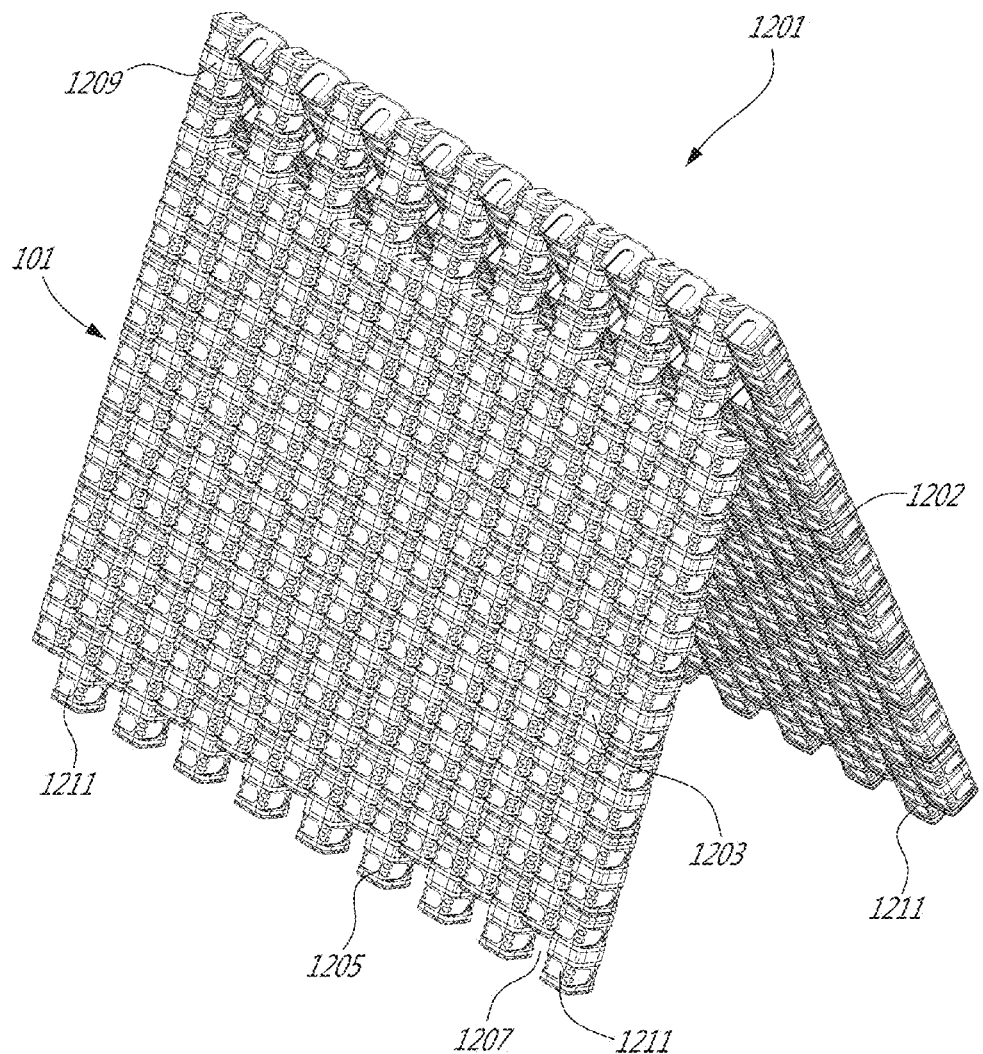

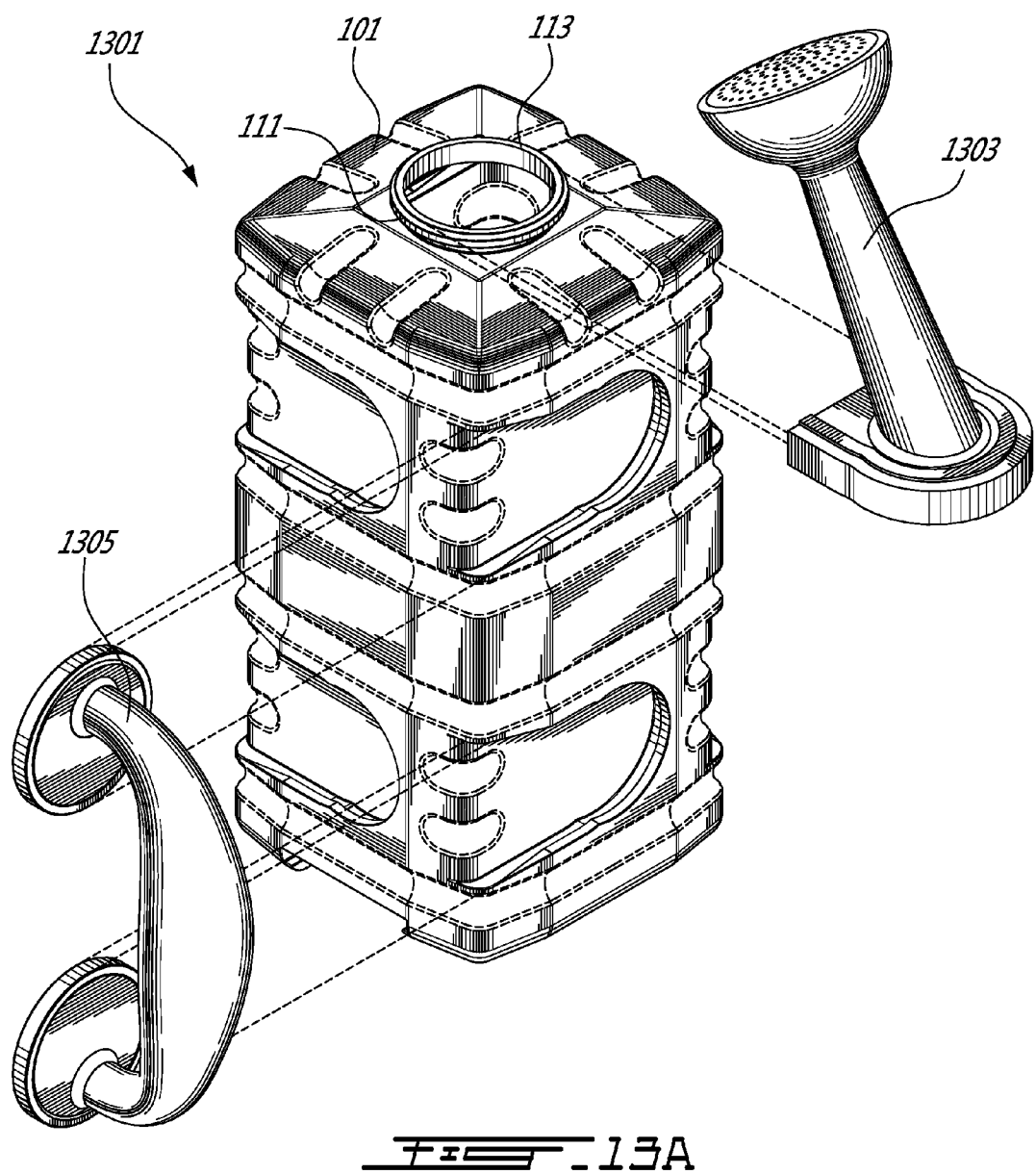

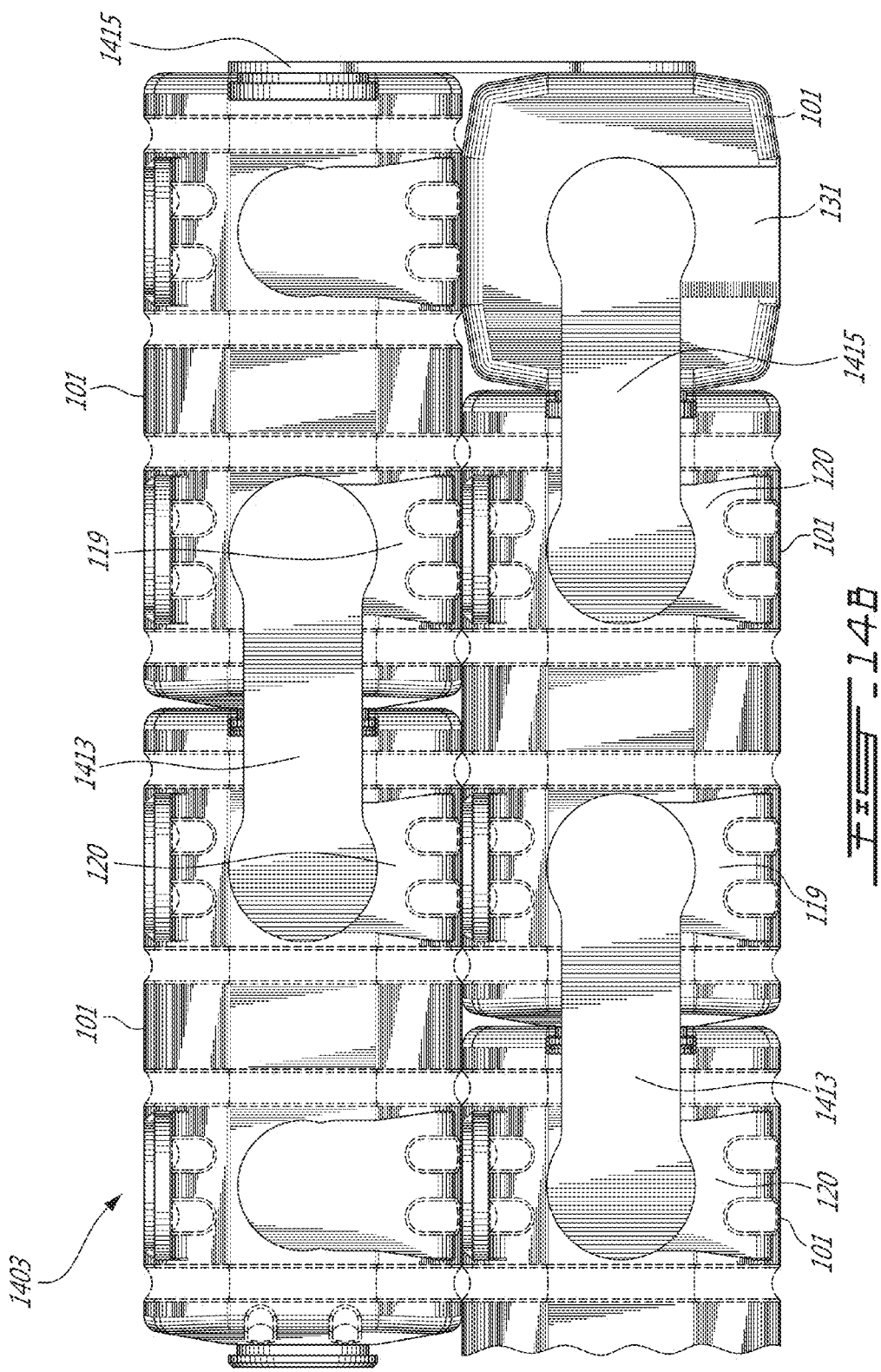

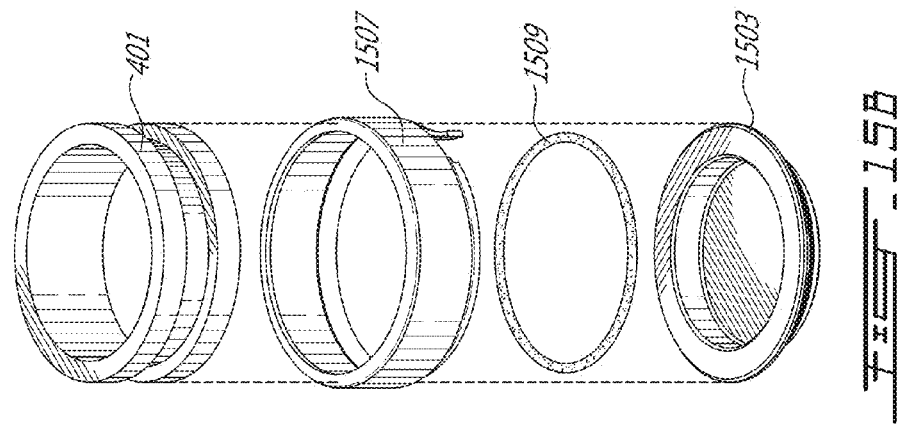
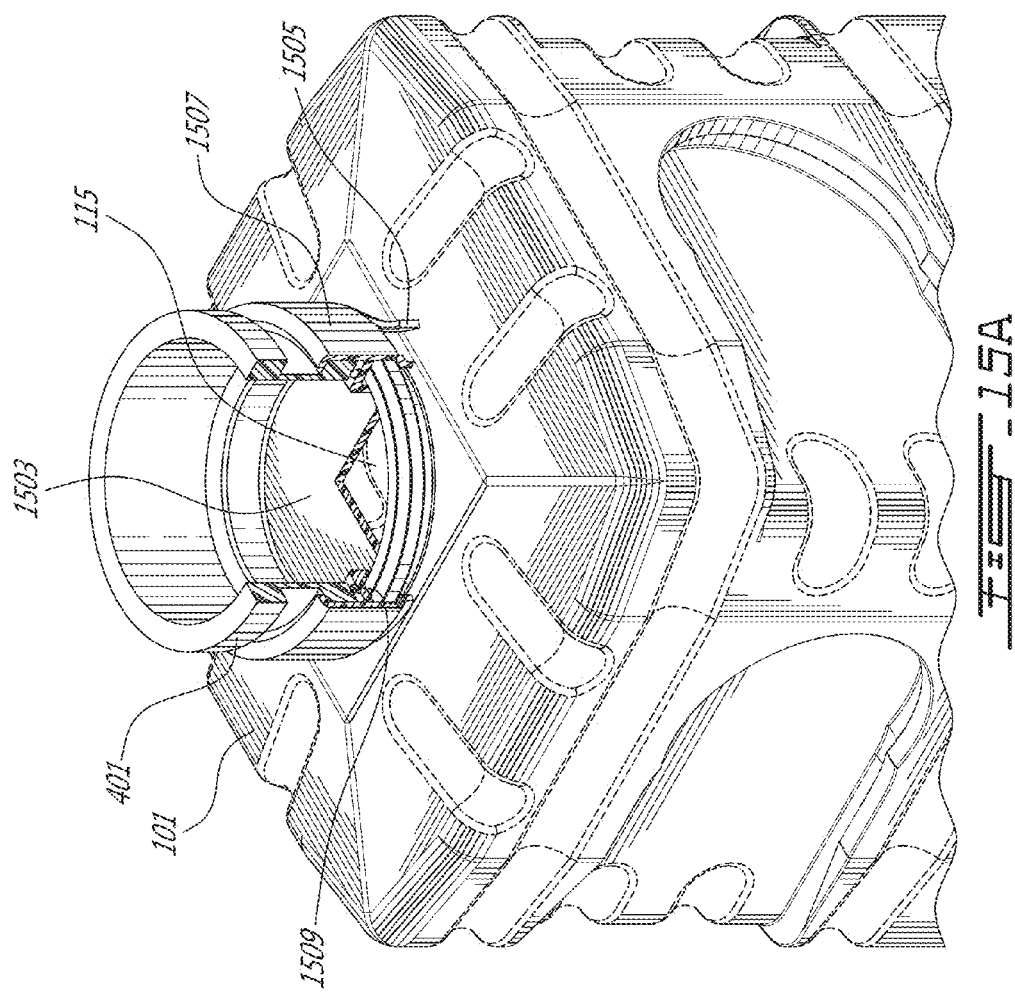

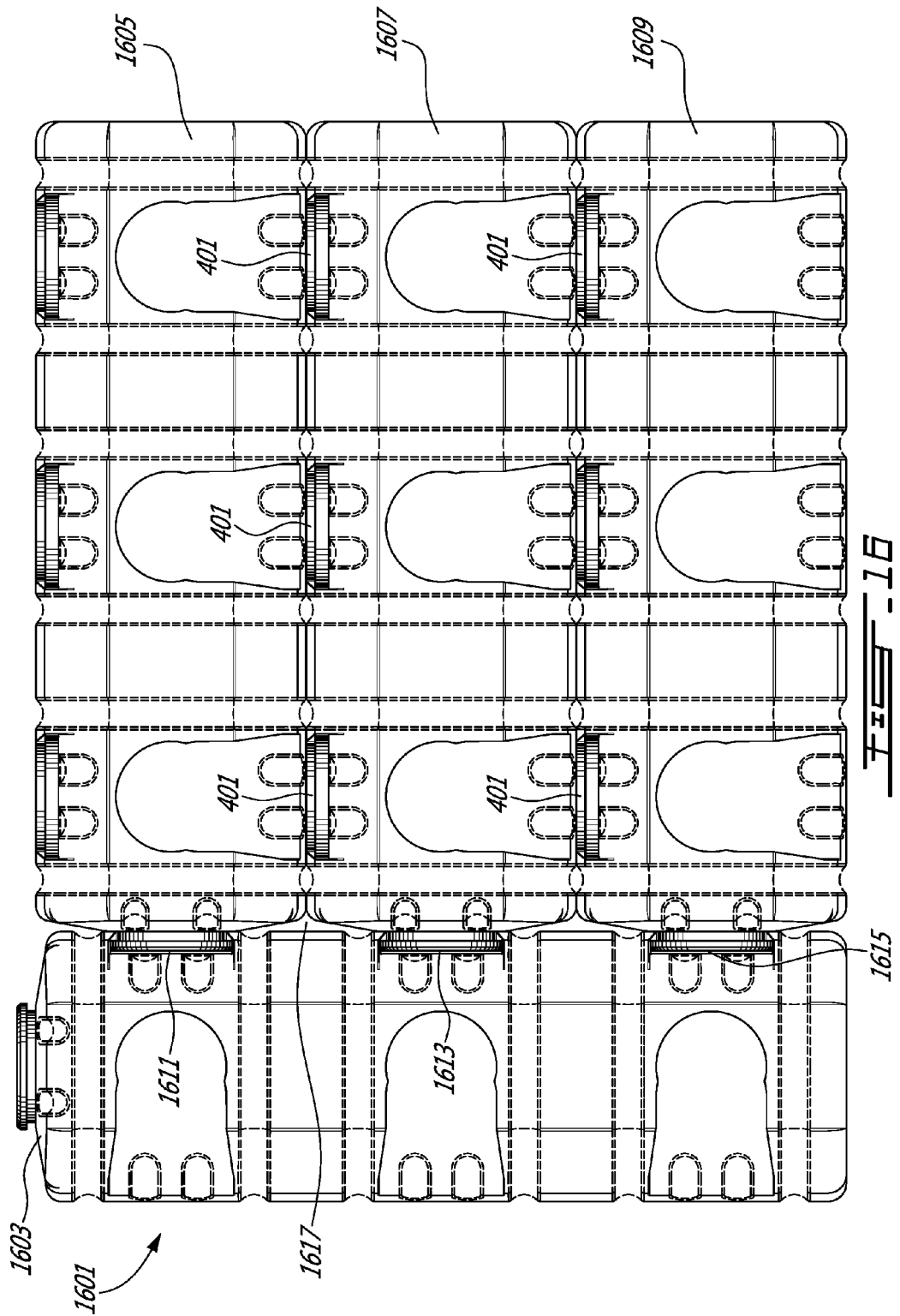

INTERCONNECTING CONTAINER SYSTEM

CROSS-REFERENCE TO RELATED APPLICATIONS

This application is a national phase entry of PCT Application No. PCT/IB2011/054185, entitled "INTERCONNECTING CONTAINER SYSTEM", filed on Sep. 22, 2011; which in turn claims priority under 35 USC §119(e) of U.S. provisional patent application(s) 61/385,777 filed Sep. 23, 2010, the specifications of which are hereby incorporated by reference.

TECHNICAL FIELD

The invention relates to interconnecting containers.

BACKGROUND OF THE ART

Plastic bottles have been criticized for the waste they generate once they have reached the end of their useful life. For this reason, much effort has been made with the intention of limiting the amount of waste generated by plastic bottles. Recycling is one way to reduce the impact on the environment but the recycling of plastic products requires several undesirable steps including transportation to the recycling plant, use of energy for the recycling process as well as the production of residual waste due to contamination in the feedstock stream. Some efforts have also been made in the past to reduce the amount of plastic used in disposable bottles.

Reuse is a solution more desirable than waste disposal or recycling because of lower energy requirements, especially if the location of re-use is close to the location of the primary use. Reusable plastic bottles exist, but meet limited success in terms of volume on the market compared to disposable plastic bottles.

Most bottles available on the market do not have the attributes to encourage reuse. The key to optimize the reuse of plastic bottles is to facilitate the assembly of the bottles into larger structures that can be used in everyday life. A standard plastic bottle is generally cylindrical, has one opening at the top of the bottle and is closed by a removable cap. As such, it does not lend itself to assemblies.

SUMMARY

One way to reduce the impact of plastic bottles on the environment is to provide other uses, in a manner that the shape and structure can serve for something other than containing the initial beverage, for example. This can be achieved by providing a bottle which has a recess formed therein mating with the neck. In this manner, two or more bottles can be assembled to one another after their initial use to form a structure. This can particularly find a use in the context of delivering water in water bottles following the occurrence of natural disasters. The persons receiving the water can thus not only benefit from the water itself, but further benefit from the structures which can be created with the bottles to provide temporary beds, or dwelling framework for instance.

In accordance with one aspect, there is provided an interconnecting container system. Each container of the system has a rounded rectangular parallelepiped body with four symmetrical rounded rectangular sidewalls, a rounded square base and a rounded square top; an elongated sidewall slot being provided on each of the four sidewalls, the elongated sidewall slot having a surrounding lip thereby creating an internal edge recess, the sidewall slot having an open end and an adjoining closed end, and wherein the adjoining closed end is centrally disposed along a transversal axis transversal to a longitudinal axis of the rectangular sidewall; an elongated base slot being provided on the base, the elongated base slot having a surrounding lip thereby creating an internal edge recess, the base slot having an open end and an adjoining closed end, the elongated base slot extends along a transversal axis of the square base, and wherein the adjoining closed end is centrally disposed on the square base; a neck being centrally provided on the top, the neck extending from the top, the neck having a surrounding rim, the neck having an opening thereon; the rim of the neck and the internal recess of the base slot and the sidewall slot being dimensioned and shaped for sliding and interconnecting engagement.

In accordance with another aspect, there is provided a plastic bottle comprising a hollow container body having a tubular wall extending from a bottom to a neck at the top, being closed except for a mouth provided through the neck, the neck having an external protrusion, and a recess having an inner shape corresponding to the external protrusion of the neck portion, wherein the plastic bottle can be attached with another identical plastic bottle by receiving the neck thereof into the recess.

In one embodiment, the protrusion and recess can be threaded.

In one embodiment, the recess can be at the bottom of the bottle.

BRIEF DESCRIPTION OF THE DRAWINGS

Having thus generally described the nature of the invention, reference will now be made to the accompanying drawings, showing by way of illustration a preferred embodiment thereof and in which FIG. 1 is a perspective view of an example bottle;

FIG. 2A is a side elevation view of an example bottle shown in FIG. 1, in which the bottom slot is visible;

FIG. 3 is a bottom plan view of an example bottle shown in FIG. 1;

FIG. 4A is a perspective view of an example connector used to join two example bottles shown in FIG.1;

FIG. 4B is a top plan view of the example connector shown in FIG. 4A;

FIG. 4C is a side elevation view of the example connector shown in FIG. 4A;

FIG. 5 is an illustration of the first step of the mating of the example connector shown in FIG. 4A and the example bottle shown in FIG. 1;

FIG. 6 is an illustration of the second and final step of the mating of the example connector shown in FIG. 4A and the example bottle shown in FIG. 1;

FIG. 7 is an illustration of a two-bottle assembly using the example bottle shown in FIG. 1, where the base of the first bottle is connected to the lower slot of the sidewall of the second bottle;

FIG. 8 is an illustration of a three-bottle assembly using the example bottle shown in FIG. 1, where the base of the first bottle is connected to the upper slot of the sidewall of the second bottle, and the third bottle top rim is connected to the lower slot of the sidewall of the second bottle;

FIG. 9A is an illustration showing five two-bottle assembly configurations using the example bottle shown in FIG. 1;

FIG. 9B is an illustration showing two additional two-bottle assembly configurations using the example bottle shown in FIG. 1;

FIG. 9C is an illustration showing four additional two-bottle assembly configurations using the example bottle shown in FIG. 1;

FIG. 9D is an illustration showing four additional two-bottle assembly configurations using the example bottle shown in FIG. 1;

FIG. 9E is an illustration showing two additional two-bottle assembly configurations using the example bottle shown in FIG. 1;

FIG. 9F is an illustration showing two additional two-bottle assembly configurations using the example bottle shown in FIG. 1;

FIG. 9G is an illustration showing two additional two-bottle assembly configurations using the example bottle shown in FIG. 1;

FIG. 9H is an illustration showing two additional two-bottle assembly configurations using the example bottle shown in FIG. 1;

FIG. 9I is an illustration showing two additional two-bottle assembly configurations using the example bottle shown in FIG. 1;

FIG. 12 is a perspective view of a shelter made using several example bottles shown in FIG. 1;

FIG. 13A is an exploded view of a watering can components, including one example bottle shown in FIG. 1;

FIG. 14B is an illustration of a five-bottle assembly using the example bottle shown in FIG. 1, where four lateral connectors are used;

FIG. 15A is a detail view of the top of the bottle shown in FIG. 1 including an example closure cap and an example retaining ring to hold a connector; and FIG. 15B is an exploded view of the example closure cap and example retaining ring shown in FIG. 15A; and FIG. 16 is an illustration of a four-bottle assembly using bottles of another example design, where the top rim of each of the three first bottles are connected to one of the three slots of a single sidewall of the fourth bottle.

It will be noted that throughout the appended drawings, like features are identified by like reference numerals.

DETAILED DESCRIPTION

Figure 2B:
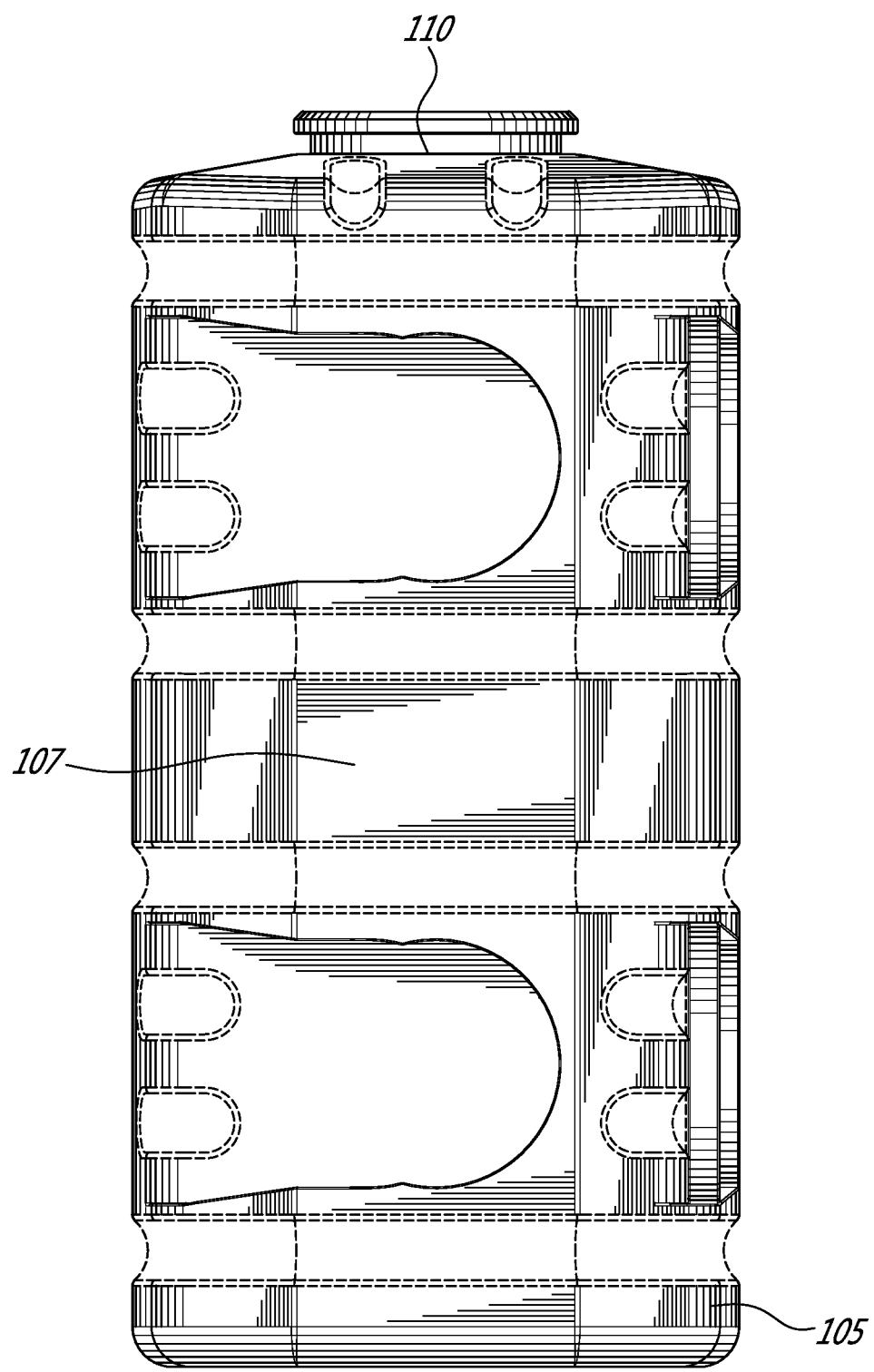
FIG. 2B is a side elevation view of an example bottle shown in FIG. 1, in which the bottom slot is not visible.

The invention presented in this description pertains to bottle designs that aim at extending their reuse to the fullest. The goal of the invention is to provide a product that not only serves its first duty as a liquid or granular material container, but that can also be reused as a building block for constructing useful structures and assemblies. We refer to products that achieve this goal efficiently as dual-use or multiple-use products.

In the following description, it is understood that the invention may be practiced without some details shown. At the same time, well-known elements may not have been shown since they are obvious to persons versed in the craft of bottle design and manufacturing. The word descriptions and drawings should be regarded as illustrative rather than restrictive since other embodiments can be used to realize the essence of the invention.

FIG. 1 shows a perspective view of an example multiple-use plastic bottle 101. In this example, the bottle shown has a generally rectangular parallelepiped body 103 that extends upwardly from a square base 105. The container sidewalls 107 and 108 extend upwardly from the base 105 to the top 110, where four shoulders 109 are located. A circular neck 111 and a circular rim 113 extend upwardly from the top 110. The rim 113 is the upper extremity that defines the bottle opening 115. The opening 115 may be used to insert content in the bottle 101 and to dispense content from the bottle 101. The neck 111 and rim 113 are designed for engagement with a closure cap, not shown in FIG. 1.

The sidewalls 107 and 108 of the example plastic bottle 101 shown in FIG. 1 feature several departures from a planar geometry. Firstly the sidewalls 107 and 108 have a slightly convex shape with a cylindrical axis in the vertical direction. Each of the four sidewalls 107 and 108 joins its two neighboring sidewalls 108 and 107 with a radius of curvature 117 in order to provide a pleasant shape free of sharp angles.

Secondly, each sidewall 107 and 108 features two identical elongated slots 119 and 120, with the long axis of the slots oriented in the plane of the sidewall and transversely from the main axis of the bottle 101. On each sidewall 107 and 108, the upper slot 119 is located above the lower slot 120. The upper slot 119 is located three fourth of the modular height of the bottle above the bottom of the base 105. The modular height of the bottle is defined to be the distance between the bottom of the base 105 and the bottom of the neck 111. The lower slot 120 is located one fourth of the modular height of the bottle above the bottom of the base 105.

Each slot 119 and 120 starts with an open end 121 and tapers down towards a closed end 123. The closed end 123 of the slot 119 features a circular shape. The closed ends 123 of both slots 119 and 120 are positioned in the middle of the sidewall 107 and 108, in the direction transverse to the main axis of the bottle 101.

The upper slot 119 also features a ridge or lip 125 around the slot 119, starting and ending at the open end 121 of the slot 119. This lip 125 creates a recess 127, located inwardly compared to lip 125. The recess 127 can hold an object of the appropriate height and width. The lip 125 of each slot 119 also features two pointed bumps 129 facing each other and that can prevent a circular object with a diameter equal to the diameter of closed end 123 of the slot 119, from coming out of the closed end 123 of the slot 119. The lower slots 120 feature the same lip 125, recess 127 and pointed bumps 129, as the upper slots 119.

It is understood that other bottle designs with one slot per sidewall would also be viable, although this design would allow less flexibility in the creation of bottle assemblies.

Another slot 131, similar to the sidewall slots 119 and 120, is located on the base 105 of the bottle 101. The base slot 131 extends in the plane of the base 105, in a direction parallel to two of the sidewalls 108 and perpendicular to the other two sidewalls 107.

Thirdly, the sidewalls 107 and 108 feature four grooves 133, 135, 137 and 139, running in the horizontal plane and encircling the body 103 of the bottle. Grooves 133 and 135 are located above and below the upper slots 119, respectively. Grooves 137 and 139 are located above and below the lower slots 120, respectively.

It is understood that all grooves in the bottle construction are optional and can be omitted or replaced by other features. In the embodiment presented in FIG. 1 the grooves increase the rigidity and structural strength of the bottle 101 in addition to improving the esthetics of the product.

A pair of superposed shorter horizontal grooves 141 is located at the height of the lower slots 119 and at the junction of each pair of neighboring sidewalls. Five other pairs of identical horizontal grooves are visible in FIG. 1 but have not been identified to avoid cluttering the drawing. In total four pairs of grooves are located at the height of the upper slots 119, three of which are visible in FIG. 1. Four other pairs of grooves are located at the height of the lower slots 120, three of which are visible in FIG. 1.

A pair of short parallel grooves 143 is located on each of the four bottle shoulders 109. The shoulder grooves 143 divide the shoulders 109 in three approximately equal segments at the junction of the shoulder 109 and neighboring sidewall 119 and 120. The shoulder grooves 143 extend from the junction of the shoulder 109 and neighboring sidewall 119 and 120 towards the neck 111 of the bottle 101, but stop approximately halfway before reaching the neck 111.

FIG. 2A shows a side view of the example bottle illustrated in FIG. 1. FIG. 2A shows the sidewall 108 extending upwardly from the base 105 to the top 110. The neck 111 is connected to the top 110 and the rim 113 is connected to the neck 111. Two upper slots 119 and two lower slots 120 are visible in FIG. 2A. The bottom slot 131 is also visible in the base 105 of the bottle 101. The four long grooves 133, 135, 137 and 139 are running in the horizontal plane and encircling the body 103 of the bottle 101. Eight short horizontal grooves 141 are also visible at the level of the upper and lower slots 119 and 120. Two additional short grooves 143 are also visible on the bottle shoulder 143.

FIG. 2B shows a different side view of the same example bottle illustrated in FIG. 1 and FIG. 2A. FIG. 2B shows the sidewall 107 extending upwardly from the base 105 to the top 110. The only difference between the views in FIG. 2A and FIG. 2B is that the bottom slot 131 is not visible in FIG. 2B.

FIG. 3 shows a bottom view of the base 105 of the bottle 101. The open end 121 of bottom slot 131 is located close to sidewall 108. The shape and function of bottom slot 131 is very similar to the upper and lower slots located on the sidewalls 107 and 108 of the bottle 101, including lip 125, recess (not visible) and pointed bumps 129. Please note that alternate designs can include grooves in the base 105, similar to the grooves 143 in the bottle shoulders 109.

The example bottle 101 feature a circular orientation of the sidewall slots such that the open end of the slots 119 and 120 of sidewall 108 is located close to sidewall 307, the open end of the slots 119 and 120 of sidewall 307 is located close to sidewall 305, the open end of the slots 119 and 120 of sidewall 305 is located close to sidewall 303 and the open end of the slots 119 and 120 of sidewall 303 is located close to sidewall 108. Several other configurations are implementable including for example designs where opposite sidewalls have slots oriented in the same direction.

FIG. 4A shows a connector 401 used to insert in a slot 119, 120 and 131 of the example bottle 101 shown in FIG. 1. The connector 401 features a toroidal shape. The connector 401 can be thought of as being composed of a cylindrical ring 405, with two protruding extremities 403, as shown in FIG. 4C. In order for the connector 401 to mate with slots 119, 120 and 131 of the example bottle 101, the external diameter of the protruding extremities 403 is slightly smaller than the width of the slot recess 127. The thickness of the protruding extremities 403 is also slightly smaller than the depth of the slot recess 127.

For good mating also the external diameter of the cylindrical ring 405 is adapted with the width of the slot lip 125. To be more precise, the external diameter of the cylindrical ring 405 is matched with the diameter of the closed end 123 of slots 119, 120 and 131. The external diameter of the cylindrical ring 405 is slightly larger than the distance between the pointed bumps 129 of the slots 119, 120 and 131, so that this small mechanical interference is able to retain the connector 401 when it is placed in the closed end 123 of slots 119, 120 and 131. The lip 125 can be elastically deformed to allow the passage of the connector 401 by applying a moderate amount of force, consistent with an action performed by an ordinary person during an assembly process.

FIG. 5 and FIG. 6 show the procedure for inserting the connector 401 in one of the slots 119, 120 or 131 of example bottle 101 shown in FIG. 1. In FIG. 5 the connector 401 is inserted in the open end 121 of slot 120, following a path (illustrated by arrow 503) perpendicular to the sidewall and until the connector 401 abuts the bottom of the slot 120.

Next, in FIG. 6 the connector 401 is translated (illustrated by arrow 505) along the axis of the slot towards the closed end 123 of the slot 120 so that the protruding extremity 603 is inserted in the slot recess 127. At some point the cylindrical ring 405 enters in mechanical interference with the slot lip 125, close to the pointed bumps 129. A moderate force elastically deforms the lip 125 outwardly, allowing the passage of the connector 401 and the seating of the connector 401 in the closed end 123 of the slot 120, as shown in FIG. 6.

To allow elastic deformation of the lip 125 of the slots, the bottle can be made of Polyethylene terephthalate (PET) or any other suitable material.

Once it is seated in the closed end 123 of the slot 120, the connector 401 exposes its second protruding extremity 605. This protruding extremity 605 can be inserted in another slot 119, 120 or 131 of an example bottle 101 shown in FIG. 1, thereby creating a two-bottle assembly. The method used to insert the second bottle is the same as the two-step process illustrated in FIG. 5 and FIG. 6, except that the connector 401 now has the first bottle attached to it during the insertion process in the second bottle.

An example resulting two-bottle assembly 701 of two bottles 101 (renumbered 703 and 705 for clarity of description) is visible in the side view of FIG. 7. In the case of the two-bottle assembly 701 shown in FIG. 7, the order of assembly is arbitrary. The connector 401 can be inserted in bottle 703 first and then bottle 705 can be attached to the assembly. Equivalently, the connector 401 can be inserted in bottle 705 first and then bottle 703 can be attached to the assembly.

FIG. 8 shows a cross-sectional view of a three-bottle assembly 801 of three bottles 101 (renumbered 811, 813, and 815 for clarity of description). Three connectors 401 (renumbered 803, 805 and 807 for clarity of description) are used to construct assembly 801. A fourth connection is performed using the neck 111 and rim 113 of bottle 811 instead of a connector 401. It is important to note that the mating of rim 113 from bottle 811 to slot 120 of bottle 813 can be made leak-proof with a proper choice of bottle material and design.

It is clear from FIG. 8 that the sloped shoulders 109 as well as the presence of grooves in the example bottle design 101 are not ideal from the point of view of producing opaque walls since these shoulders 109 and grooves create light and air passages. Other bottle designs can preserve the spirit of the invention while omitting grooves and using non-sloped shoulders, at the detriment of structural strength and perhaps esthetics. Alternatively, clever assemblies of the example bottle design 101 can be devised to eliminate or minimize the number of light and air passages in multi-layer assemblies.

Several assembly procedures can be used to produce the three-bottle assembly 801 shown in FIG. 8. One example is first to insert connectors 803 and 805 in slots 120 and 119 of bottle 811, respectively. Next slots 119 and 120 of bottle 815 are simultaneously inserted in the free ends of connectors 803 and 805, thus forming a two-bottle assembly. A connector 807 is then inserted in the bottom slot 131 of bottle 815. Finally the rim 113 of bottle 811 and connector 807 are simultaneously inserted in slots 120 and 119 of bottle 813, respectively, thus forming the three-bottle assembly 801.

Another equivalent method for producing the three-bottle assembly 801 shown in FIG. 8 involves first inserting the connectors 803 and 805 in the slots of bottle 815 instead of in the slots of bottle 811. The rim 113 of bottle 811 and connector 807 are then simultaneously inserted in slots 120 and 119 of bottle 813 as in the first method.

A third method exists for producing the three-bottle assembly 801 shown in FIG. 8. First the rim 113 of bottle 811 is inserted in slot 120 of bottle 813, thus forming a L-shaped two-bottle assembly. Next, the three connectors 803, 805 and 807 are inserted in slots 120 and 119 of bottle 811, as well as in slot 119 of bottle 813, respectively. The last step involves simultaneously inserting the free ends of accessories 803, 805 and 807 into the slots 119, 120 and 131 of bottle 815. In this case only one orientation of bottle 815 allows this insertion to take place. This orientation consists in aligning sidewall 107 of bottle 815, against bottle 811. In this orientation all three slots 119, 120 and 131 of bottle 815 are aligned in the same axis, allowing simultaneous insertion.

The characteristics of the invention enable a large number of assembly configurations. For example FIG. 9A to FIG. 9I illustrate 25 different two-bottle assembly configurations. In each of these figures, several configurations are illustrated simultaneously relative to the reference bottle 101 (renumbered 902, for clarity of description). For example FIG. 9A illustrates five different ways for a bottle 101 to connect to the reference bottle 902. In FIG. 9A to 9E the configurations are arranged so the axes of both assembled bottles lie in the same plane. In FIG. 9F to 9I the configurations are arranged so the axe of one bottle is perpendicular to the axis of the other bottle.

The configurations illustrated in FIG. 9F and 9H show the reference bottle 902 with the opening 115 facing the viewer. The configurations illustrated in FIG. 9G and 9I show the reference bottle 902 with the base 105 facing the viewer. The reason why the configuration shown in FIG. 9F is distinct from the configuration shown in FIG. 9H is the lack of symmetry of the bottle caused by the orientation of the bottom slot 131. The same argument applies to the configurations shown in FIGS. 9G and 9I.

Figure 10:
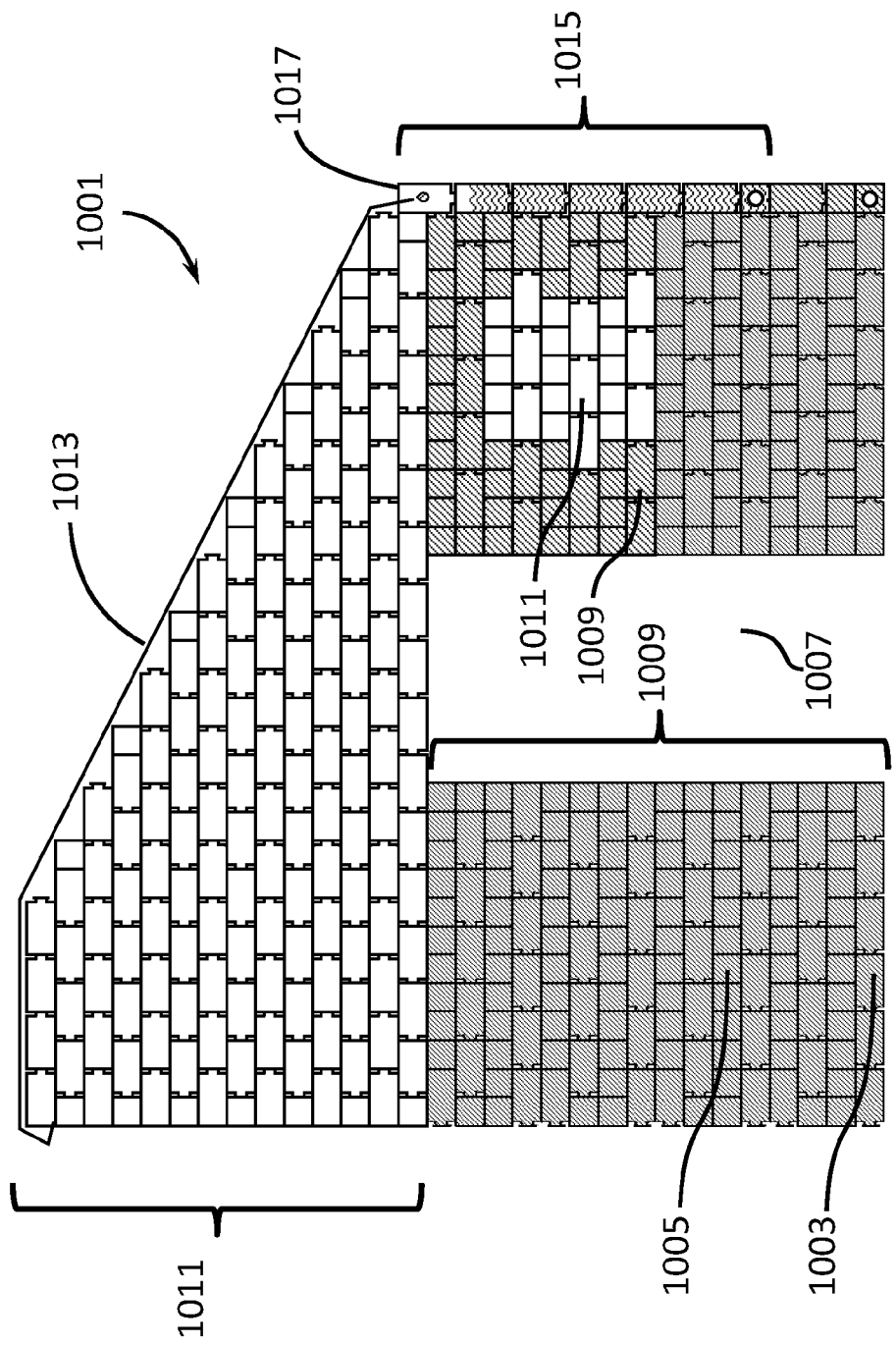
FIG. 10 is a front elevation view of a dwelling made using several example bottles shown in FIG. 1, where a rainwater collection and storage system is visible.

Assemblies with tens, hundreds or thousands of bottles are even more interesting since they allow advanced structures to be constructed. FIG. 10 illustrates the front view of an example dwelling 1001 build with approximately 4000 of the example bottle 101 shown in FIG. 1. The walls of the dwelling 1001 have a thickness equal to a modular height of the bottle, i.e. twice the width of the bottle body 103. This allows using either two bottles 101 (shown by reference numeral 1003 in FIG. 10) parallel to the wall or a single bottle 101 (shown by reference numeral 1005 in FIG. 10) perpendicular to the wall. The mixing of parallel and perpendicular bottle orientation yields a better overall structural integrity.

Bottles in some areas of the wall can be omitted to allow entrance 1007 in the dwelling 1001. During the construction, some bottles 101 (shown by reference numeral 1009 in FIG. 10) can be filled with sand, soil or any other material available to increase the strength and weight of the construction. Some bottles 101 (shown by reference numeral 1011 in FIG. 10) can be assembled empty to allow natural light to enter in the shelter 1001.

Another feature of the dwelling 1001 shown in FIG. 10 is the rainwater collector and storage system. The rainwater collector and storage system is composed of a waterproof membrane 1013 and an array of bottles 101 (shown by reference numeral 1015 in FIG. 10) attached to the dwelling 1001 external wall. When rain falls, it trickles down the waterproof membrane 1013 into the first row 1017 of bottles of the rainwater collector and storage system, which bottom have been cut out to ease the collection of the rainwater.

Figure 11:
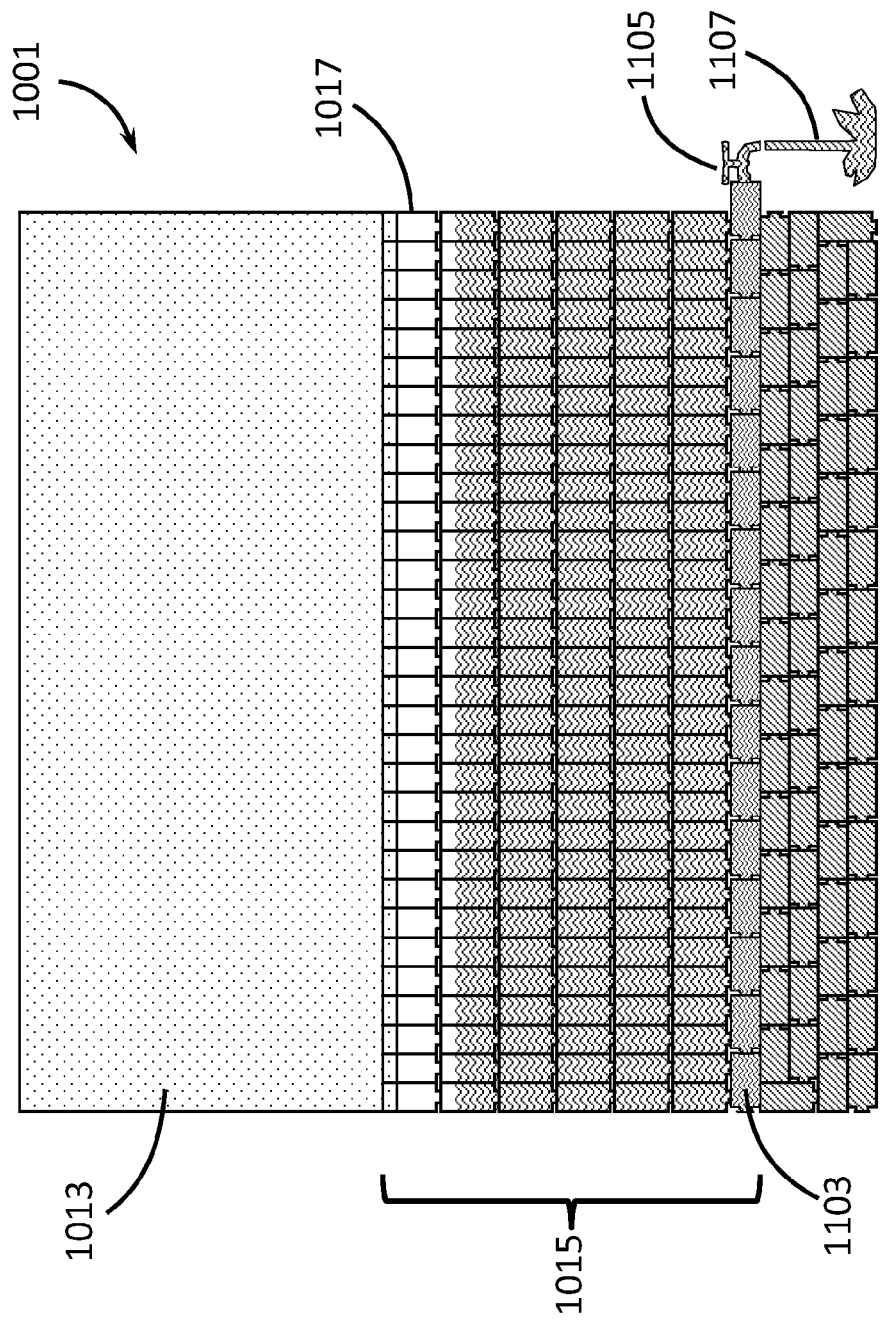
FIG. 11 is a side elevation view of a dwelling made using several example bottles shown in FIG. 1, where a rainwater collection and storage system is visible.

FIG. 11 shows the side view of the example dwelling 1001 shown in FIG. 10. The lower bottles 1103 of the array of bottles 1015 of the rainwater collector and storage system are oriented horizontally and act as a manifold to allow dispensing the collected rainwater 1107 at a single tap 1105 installed at one end of the system.

The bottles used to compose the rainwater collector and storage system are modified to allow the flow of rainwater, including the first row 1017 of bottles which bottom have been cut out. In all the other bottles of the rainwater collector and storage system, a hole is made in the base 105 to allow water to flow to or from a neighboring bottle whose rim 113 has been mated in the bottom slot 131 of the modified bottle. The lower bottles 1103 of the array of bottles 1015 are also modified so that openings are made in the slots 119 and 120 that are mated with the vertical bottles of the rainwater collector and storage system.

The possibilities of making useful constructions with the example bottle 101 or variations of the example bottle 101 are endless. Some examples include dwellings, shelters, greenhouses, chapels, tents, tent structures, monuments, roofs, walls, windows, wall insulation, doors, privacy curtains, lecterns, altars and pews, podiums, stages, flooring, steps, stairs, construction blocks, fences, patios, pergolas, tables, benches, night tables, lamps, chandeliers, lampposts, chairs, deck chairs, sofas, desks, beds, cribs, shower systems, saunas, toilet bowls, pots for fruit and vegetable, flower pots, planting trays, ladders, stretchers, crutches, walkers, carts, trailers, tool boxes, safes, frames, enclosures, pallets, trays, backpacks, shelving systems, storage units, composting bins, sticks, poles, masts, stakes, crosses, wind mills, weather vain, scarecrows, umbrellas, measuring rods, sundials, emergency signaling systems, traps, cages, docks, boats, rafts, barges, wakeboards, surfboards, canoes, paddleboats, sail boats, catamarans, floating bridges, floating docks, fishing rods, floats and weights for holding fishing nets, snorkels, buoys, irrigation systems, piping for liquids, sprinkler systems, water containers, water containers for carrying horses, rainwater collectors, liquid storage systems, water transportation devices, drainage piping, float lines for swimming, toys for swimming pools, floating beds, floating islands, slides, siphons, birdhouses, bird feeders, works of art, decoration, trophies, sculptures, musical wind instruments, musical instruments powered by the wind, guitars, mazes, boxing rings, children playhouses, toboggans, soccer goal posts, water games for children, sticks for playing with a ball, hockey nets, dog houses, beddings for cats, etc.

Another characteristic of the invention is the possibility to assemble bottles with an arbitrary angle between the axes of the bottles, instead of just parallel or perpendicular as presented so far. An example of an arbitrary angle assembly is illustrated in the shelter 1201 shown in FIG. 12. The example shelter 1201 is composed of two identical panels 1202 and 1203. Each panel 1202 and 1203 is constructed with 144 example bottles 101 shown in FIG. 1, in eighteen columns alternating between long columns 1205 and short columns 1207. The long columns 1205 extend by one bottle and a half compared to the short columns 1207. The top bottles 101 (shown by reference 1209 in FIG. 12) of the left panel 1203 are mated with one or two top bottles 1209 of the right panel 1205 using connectors 401. Note that only one of the eighteen top bottles 1209 are identified in FIG. 12 to avoid cluttering the drawing. Since the connectors 401 have a circular symmetry, the angle between the left panel 1203 and the right panel 1202 can be adjusted to any desired value. Once optimized, the relative orientation of the panels can be maintained by inserting the above-ground portion of four judiciously placed stakes (not shown in FIG. 12) in the opening 115 of the four long-column corner bottles 1211, for which only three are visible in FIG. 12. A waterproof membrane (not shown in FIG. 12) would normally be used with the example shelter 1201 in order to improve its weather resistance.

Specialized accessories can enhance the usability of the constructions made with the example bottle 101 shown in FIG. 1. FIG. 11 shows the use of a tap 1107 to control the dispensing of rainwater. FIG. 13A shows two accessories 1303 and 1305 that are designed to convert a single example bottle 101 into a watering can 1301. A showerhead accessory 1303 is designed to mate with the neck 113 and rim 11 of the bottle 101 and create a leak-proof connection with the rim 113 of the example bottle 101. A handle accessory 1305 is designed to mate simultaneously with the two slots 119 and 120 of any sidewall 107 or 108 of the example bottle 101.

Figure 13B:
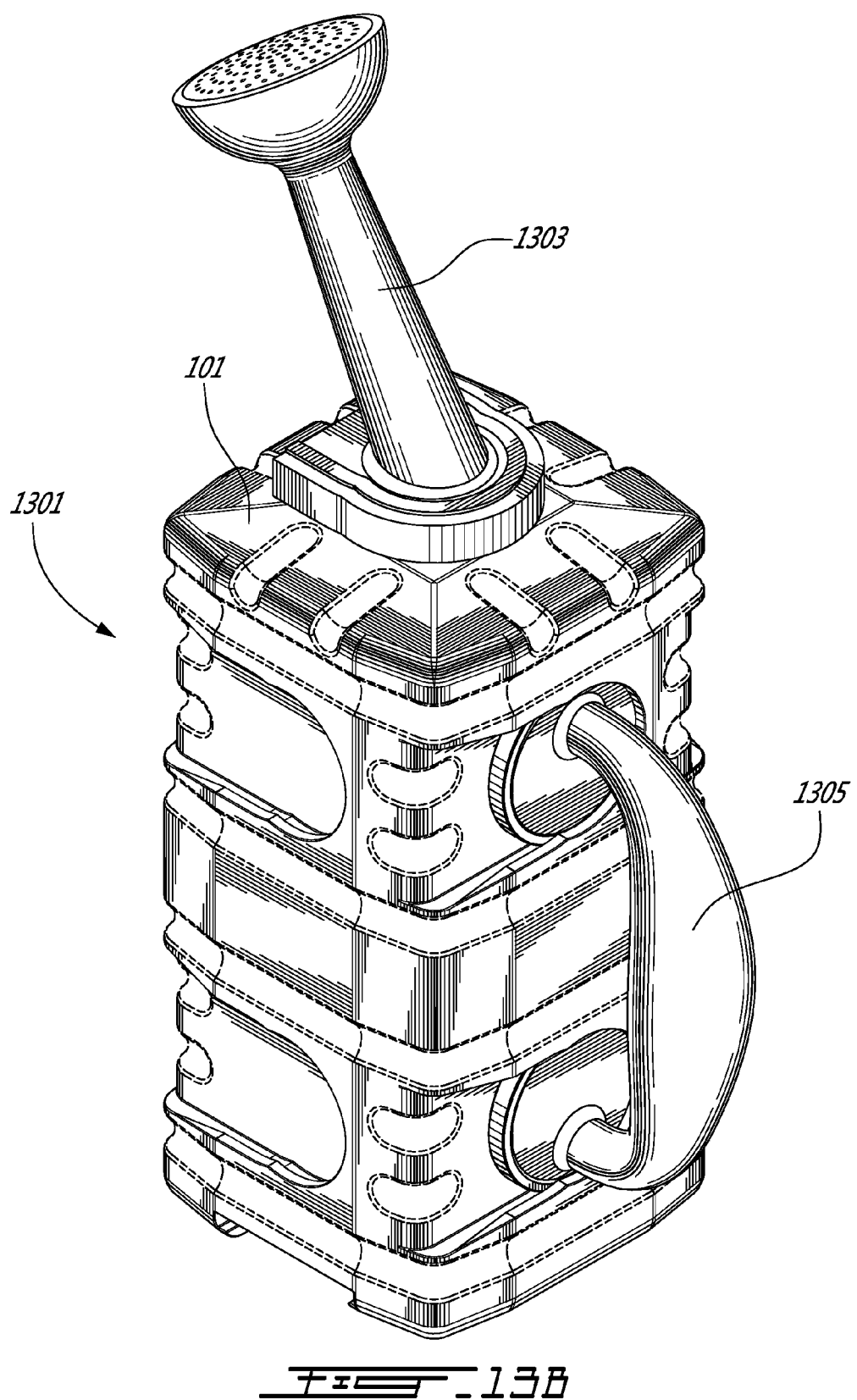
FIG. 13B is a perspective view of an assembled watering can.

FIG. 13B shows the assembled watering can 1301, ready for use. The same accessories 1303 and 1305 can also be mated to an assembly of multiple example bottles 101 to increase the capacity of the watering can.

Other useful accessories include sealing plugs, rings with multiple connectors for the construction of radial assemblies, eyebolts for making structures that can be lifted with ropes, cables or belts, gimbaled accessory to connect two assemblies at arbitrary angles, etc.

Figure 14A:
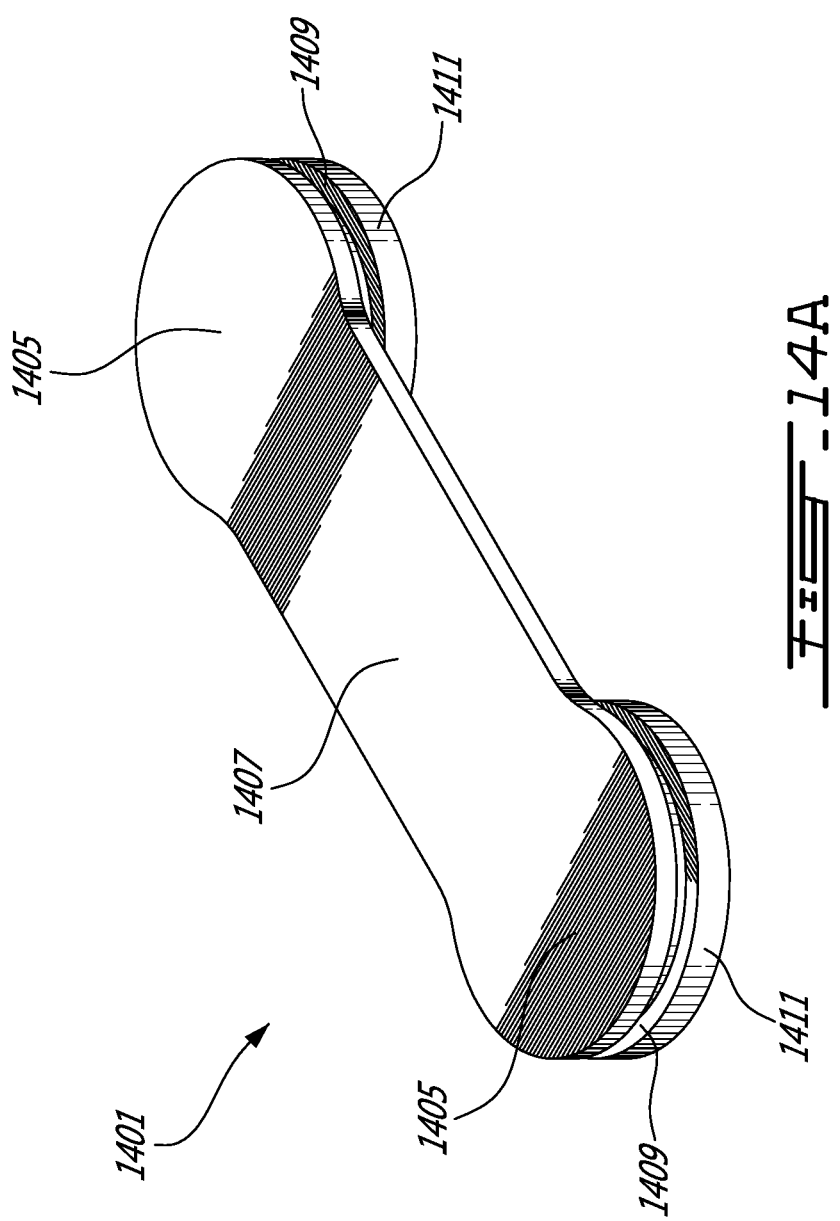
FIG. 14A is a perspective view of an example lateral connector used to join two example bottles shown in FIG. 1.

FIG. 14A shows an example lateral connector 1401. The connector 1401 is composed of two identical ends 1405 joined by a thin strip 1407. The end-to-end distance is equal to the distance between two slots on one sidewall of the example bottle 101. Each end 1405 features a cylindrical ring section 1409 with one cylindrically protruding extremity 1411. The cylindrical ring section 1409 with its protruding extremity 1411 is equivalent to half of the connector 401 presented in FIG. 4. In order for one end 1405 of the lateral connector 1401 to mate with slots 119, 120 and 131 of the example bottle 101, the external diameter of the protruding extremity 1411 is slightly smaller than the width of the slot recess 127. The thickness of the protruding extremity 1411 is also slightly smaller than the depth of the slot recess 127.

FIG. 14B shows an assembly 1403 of five example bottles 101 shown in FIG. 1 using four example lateral connectors 1401. Two lateral connectors 401 (shown by reference 1413 in FIG. 14B) are used to join two bottles 101 by insertion in the sidewall slots 119 and 120 of each bottle 101. Two lateral connectors 401 (shown by reference 1415 in FIG. 14B) are used to join two bottles by insertion in the sidewall slot 120 of one bottle 101 and in the bottom slot 131 of the other bottle 101.

FIG. 15A shows an example cap 1503 for the sealing of the opening 115 of the example bottle 101 shown in FIG. 1. The cap 1503 fits inside the opening 115 and can be present when a mating is performed between the neck 111 and rim 113 of a bottle with the slot of another bottle if desired. An optional retaining ring 1507 can be used to secure a connector 401 to the bottle. The retaining ring 1507 is made of a soft plastic so that it can be inserted during the manufacturing and that it can be removed by tearing off a ribbon section starting at the tear tab 1505.

FIG. 15B shows an exploded view of example cap 1503 and optional retaining ring 1507 assembly shown in FIG. 15A. An optional o-ring 1509 can also be included in the assembly if desired.

Other methods of providing connectors 401 with one example bottle 101 include the insertion of up to nine connectors 401 in the slots 119, 120 and 131 of the bottle 101.

If desired, the slots 119, 120 and 131 can also be used to insert useful objects such as small containers of food material to be added to water, including dehydrated juice, dehydrated soup, powdered milk, flavor, etc. The slots 119, 120 and 131 can also contain small containers of basic cooking material such as baking soda, salt, sugar, etc. Alternatively, small containers can be used to store instructions for shelter assembly, water purification kits, vitamins, pain killers, medicine, food supplements, appetite suppressant, seeds of fruits and vegetables, disinfectants, soap, etc.

The example bottle 101 shown in FIG. 1 has a liquid capacity of approximately 1.5 . The external linear dimension of the square base 105 is 95.25 mm, while the modular height is twice this amount, i.e. 190.5 mm. The height of the neck 111 is 3.2 mm. The external diameter of the neck 111 is 39.3 mm. The height of the rim 113 is 4.8 mm. The external diameter of the rim 113 is 44.4 mm. The internal diameter of the opening 115 is 37.3 mm. It is understood that these dimensions are only exemplary and various other dimensions and proportions can be used while preserving the essence of the invention.

It is interesting to note that example bottle 101 shown in FIG. 1 complies the following design rule: excluding the neck 111 and rim 113, the external dimensions closely match a geometrical shape composed of two superposed cubes, hence the modular height is twice the linear dimension of the square base. This design rule allows the construction of closed-pack assemblies, for example the assembly of three bottles 811, 813 and 815 shown in FIG. 8. We note that the two-bottle sub-assembly made up of bottles 811 and 815 in FIG. 8 has the same height as bottle 813. Note also that the upper slots 119 or 120 (shown by reference 817, 819 and 821 in FIG. 8) are disposed at the same height and that the distance between slot 821 and slot 819 is the same as the distance between slot 819 and slot 817. Similarly the rim 113 of bottle 813 allows mating with a bottle that would also be mated with the slot 825 of bottle 815 (using a connector 401).

One can state that the example bottle 101 shown in FIG. 1 is composed of two "atomic cubes". Each cube features a mating instrument at the center of each of its exposed surfaces. All mating instruments are slots for interfacing with a connector 401, with the exception of the top rim of the bottle, which is equivalent to a connector 401 permanently mounted in a virtual slot.

The essence of the invention can be materialized using alternate bottle designs composed of a single atomic cube, or a multiplicity of atomic cubes. For example, an alternate design composed of three atomic cubes is used in FIG. 16 to display a four-bottle assembly 1601. The example three-cube bottle 1603 is shown along with three identical three-cube bottles 1605, 1607 and 1609, each inserted in one of the three slots 1611, 1613 and 1615 of sidewall 1617 of bottle 1603. Bottle 1605 is secured to bottle 1607 using three connectors 401. Bottle 1607 is secured to bottle 1609 using only two connectors 401.

Other alternate bottle designs examples include a four-cube high bottle, a two-cube high by two-cube wide bottle or any regularly shaped designs. As long as they are using atomic cubes of identical dimensions, it is even possible to make multi-bottle assemblies using bottles of different designs. For example, bottle 1605 could have been a two-cube bottle instead of a three-cube bottle.

It will be understood that the adjoining closed end of the elongated base slot can be threaded and if the neck is also threaded, it would allow a threaded connection between the top and bottom of two containers once inserted in one another.

The embodiments described above are intended to be exemplary only. The scope of the invention is therefore intended to be limited solely by the appended claims.

I claim:

1. An interconnecting container system comprising:
a plurality of containers, each container including:
a rounded rectangular parallelepiped body, the body having four symmetrical rounded rectangular sidewalls, a rounded square base and a rounded square top, each of the sidewalls having a longitudinal axis;
at least two elongated sidewall slots disposed on at least one sidewall of the body, each of the at least two sidewall slots having a surrounding lip thereby creating an internal edge recess, each of the at least two sidewall slots having an open end and an adjoining closed end, the open and closed ends of each of the at least two sidewall slots being each disposed along a different transverse axis along the at least one sidewall, the at least two sidewall slots being transversely disposed at a distance from each other along the longitudinal axis of the at least one sidewall;
an elongated base slot disposed on the base of the body, the elongated base slot having a surrounding lip thereby creating an internal edge recess, the base slot having an open end and an adjoining closed end, the base slot extending along a transversal axis of the base, the adjoining closed end being centrally disposed on the base;
a neck being centrally disposed on the top of the body, the neck extending from the top, the neck having a surrounding rim defining an opening;
wherein the rim of the neck and the internal recesses of the base slot and of the at least two sidewall slots being dimensioned and shaped for sliding along the associated transverse axis and interconnecting engagement with each other,
each of the sidewall slots and the base slot of a first container is adapted to be interlocked with a neck of at least one other container,
each of the at least two sidewall slots of a given sidewall of a first container is adapted to be connected and disconnected independently from each other to necks of at least two separate containers.

2. The interconnecting container system as claimed in claim 1, wherein each of the open ends of the at least two sidewall slots extends from a longitudinal edge of its associated sidewall.

3. The interconnecting container system as claimed in claim 1, wherein the closed end of at least one of the sidewall and base slots has at least one pointed bump disposed at a junction between the open end and the closed end.

4. The interconnecting container system as claimed in claim 1, wherein the neck is cylindrical and the closed end of at least one of the sidewall and base slots is at least partly circular.

5. The interconnecting container system as claimed in claim 1, wherein each of the sidewalls has the at least two sidewall slots, the at least two sidewall slots being disposed along the associated longitudinal axis of the sidewall they are disposed onto, and the at least two sidewall slots being disposed symmetrically relative to a centrally disposed transversal axis transverse to the longitudinal axis.

6. The interconnecting container system as claimed in claim 1, further comprising a plurality of connectors, each of the connectors having a ring body with two protruding extremities, each of the protruding extremities being matched for sliding and interconnecting engagement with the internal recess of at least one of the sidewall and base slots, each of the plurality of connectors being adapted to be interlocked with two of the plurality of containers.

7. The interconnecting container system as claimed in claim 6, wherein the ring body is circular.

8. The interconnecting container system as claimed in claim 6, wherein the ring body is hollow.

9. The interconnecting container system as claimed in claim 6, further comprising a cap, the cap mating with at least one of the plurality of connectors and with the rim of the neck to seal the opening of the neck.

10. The interconnecting container system as claimed in claim 1, further comprising a slot accessory, the slot accessory having a slot accessory body with at least one protruding extremity, the at least one protruding extremity being matched for sliding and interconnecting engagement with the internal recess of an associated one of the sidewall and base slots.

11. The interconnecting container system as claimed in claim 1, further comprising a neck accessory, the neck accessory having a neck accessory body with at least one slot-matched for sliding and interconnecting engagement with the rim of the neck.

12. The interconnecting container system as claimed in claim 1, further comprising a cap, the cap mating with the rim of the neck to seal the opening of the neck.

13. The interconnecting container system as claimed in claim 1, wherein the closed end of the base slot of a first container is threaded; and
the neck of a second container is threaded, a thread of the neck of the second container is adapted to cooperate with a thread of the base slot of the first container.

14. The interconnecting container system as claimed in claim 6, wherein each of the at least two sidewall slots of a given sidewall of a first container is adapted to be connected and disconnected independently from each other by a connector to necks of at least two other containers.

15. The interconnecting container system as claimed in claim 10, wherein the slot accessory body is one of a handle, a cover, and a container.

16. The interconnecting container system as claimed in claim 11, wherein the neck accessory body is one of a handle, a spout, a tap, a showerhead, a cover, a cap, and a container.

* * * * *

UNITED STATES PATENT AND TRADEMARK OFFICE
CERTIFICATE OF CORRECTION

| | | |
|---|---|---|
| PATENT NO. | : 8,662,328 B2 | Page 1 of 1 |
| APPLICATION NO. | : 13/581526 | |
| DATED | : March 4, 2014 | |
| INVENTOR(S) | : Raymond Boisvert | |

It is certified that error appears in the above-identified patent and that said Letters Patent is hereby corrected as shown below:

Title page, item (87), line 2, delete "Mar. 9, 2012" and insert --Mar. 29, 2012--.

Signed and Sealed this
Eleventh Day of November, 2014

Michelle K. Lee
*Deputy Director of the United States Patent and Trademark Office*